(12) United States Patent
Takeichi

(10) Patent No.: US 9,606,649 B2
(45) Date of Patent: Mar. 28, 2017

(54) ELECTRONIC DEVICE, INFORMATION PROCESSING APPARATUS AND CONTROL METHOD THEREFOR

(71) Applicant: CANON KABUSHIKI KAISHA, Tokyo (JP)

(72) Inventor: Shinya Takeichi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 403 days.

(21) Appl. No.: 13/864,537

(22) Filed: Apr. 17, 2013

(65) Prior Publication Data

US 2013/0321301 A1 Dec. 5, 2013

(30) Foreign Application Priority Data

May 31, 2012 (JP) ................................. 2012-125150
Apr. 4, 2013 (JP) ................................. 2013-078984

(51) Int. Cl.
*G06F 3/041* (2006.01)
*G06F 3/0484* (2013.01)
*G06F 3/0488* (2013.01)

(52) U.S. Cl.
CPC ............ *G06F 3/041* (2013.01); *G06F 3/0418* (2013.01); *G06F 3/04842* (2013.01); *G06F 3/04883* (2013.01); *G06F 3/04886* (2013.01)

(58) Field of Classification Search
CPC .... G06F 3/041; G06F 3/04883; G06F 3/0418; G06F 3/0482; G06F 3/04842; G06F 3/04886
USPC ........................................................ 345/173
See application file for complete search history.

(56) References Cited

U.S. PATENT DOCUMENTS

| | | | | |
|---|---|---|---|---|
| 5,119,079 A * | 6/1992 | Hube et al. | ................... | 715/823 |
| 5,627,567 A * | 5/1997 | Davidson | ...................... | 345/173 |
| 6,023,265 A * | 2/2000 | Lee | ............................... | 345/173 |
| 2005/0030291 A1* | 2/2005 | Yanagisawa | .................. | 345/173 |
| 2009/0251410 A1 | 10/2009 | Mori et al. | ..................... | 345/157 |
| 2009/0289911 A1 | 11/2009 | Nagai | ........................... | 345/173 |
| 2009/0303187 A1* | 12/2009 | Pallakoff | ............. | G06F 3/04886 |
| | | | | 345/169 |
| 2010/0131552 A1* | 5/2010 | Lim | .............................. | 707/769 |
| 2011/0083104 A1* | 4/2011 | Minton | ........................ | 715/815 |
| 2011/0267278 A1* | 11/2011 | Wickstrom | ................... | 345/173 |
| 2011/0302519 A1* | 12/2011 | Fleizach et al. | ............. | 715/773 |
| 2013/0305174 A1* | 11/2013 | Kim et al. | ..................... | 715/765 |

FOREIGN PATENT DOCUMENTS

| JP | 2009-245239 A | 10/2009 |
|---|---|---|
| JP | 2010-55225 A | 3/2010 |

* cited by examiner

*Primary Examiner* — Jonathan Horner
(74) *Attorney, Agent, or Firm* — Fitzpatrick, Cella, Harper & Scinto

(57) ABSTRACT

When a touch panel is operated and erroneous processing has been performed, the probability of the same operation error next time is reduced. For this purpose, when a touch to the touch panel is detected, one of respective items in a menu, which the touch position belongs to is determined. Then processing regarding the determined item is performed. At this time, when a designation input indicating that the selection of the item corresponding to the executed processing was not intended by the operator has been made, to narrow a decision area to decide selection of the item, information indicating the decision area is updated.

18 Claims, 23 Drawing Sheets

TOUCH POINT P

TOUCH POINT P

ADD TO PROCESSING-I DECISION AREA
TOUCH POINT P
ADD TO PROCESSING-K DECISION AREA
ADD TO PROCESSING-H DECISION AREA

F I G. 7
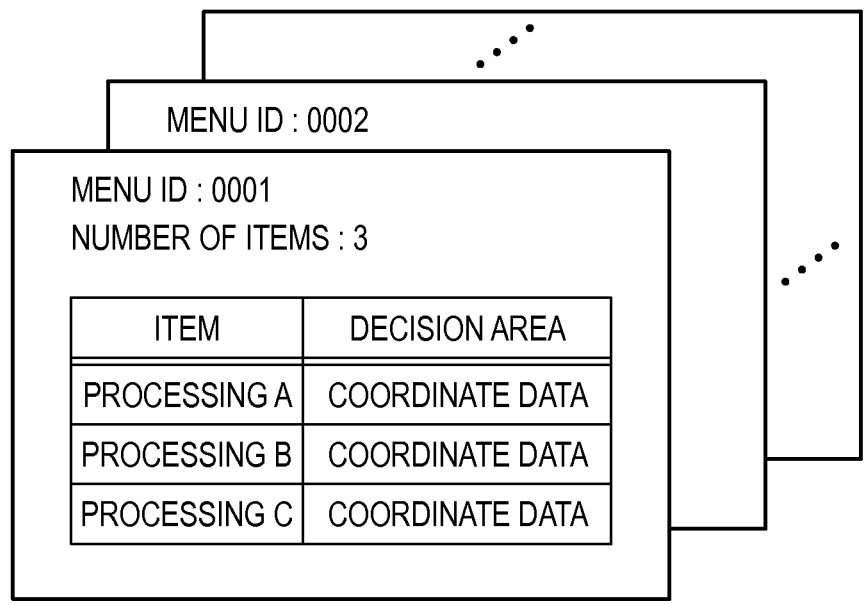

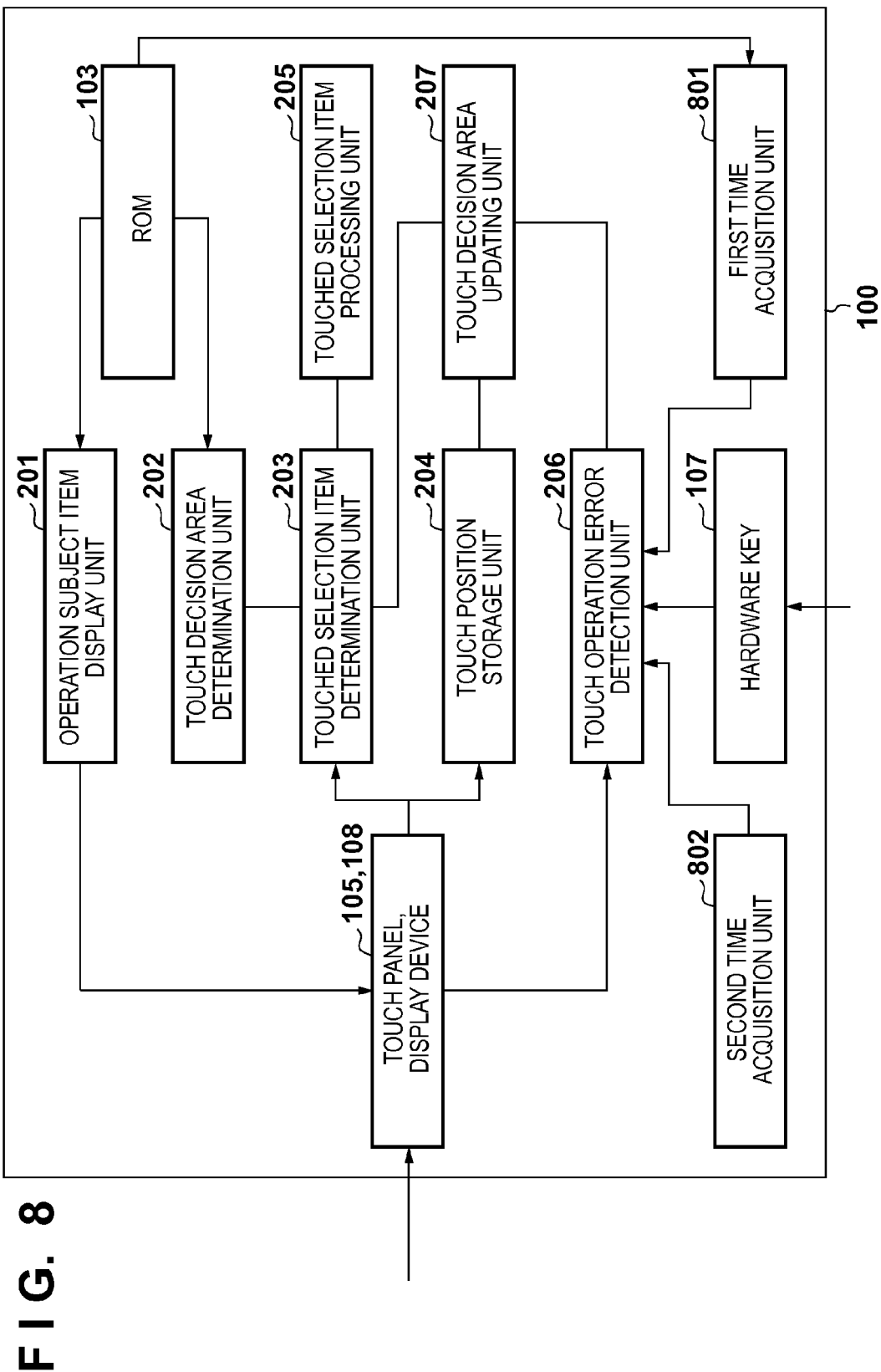
F I G. 8

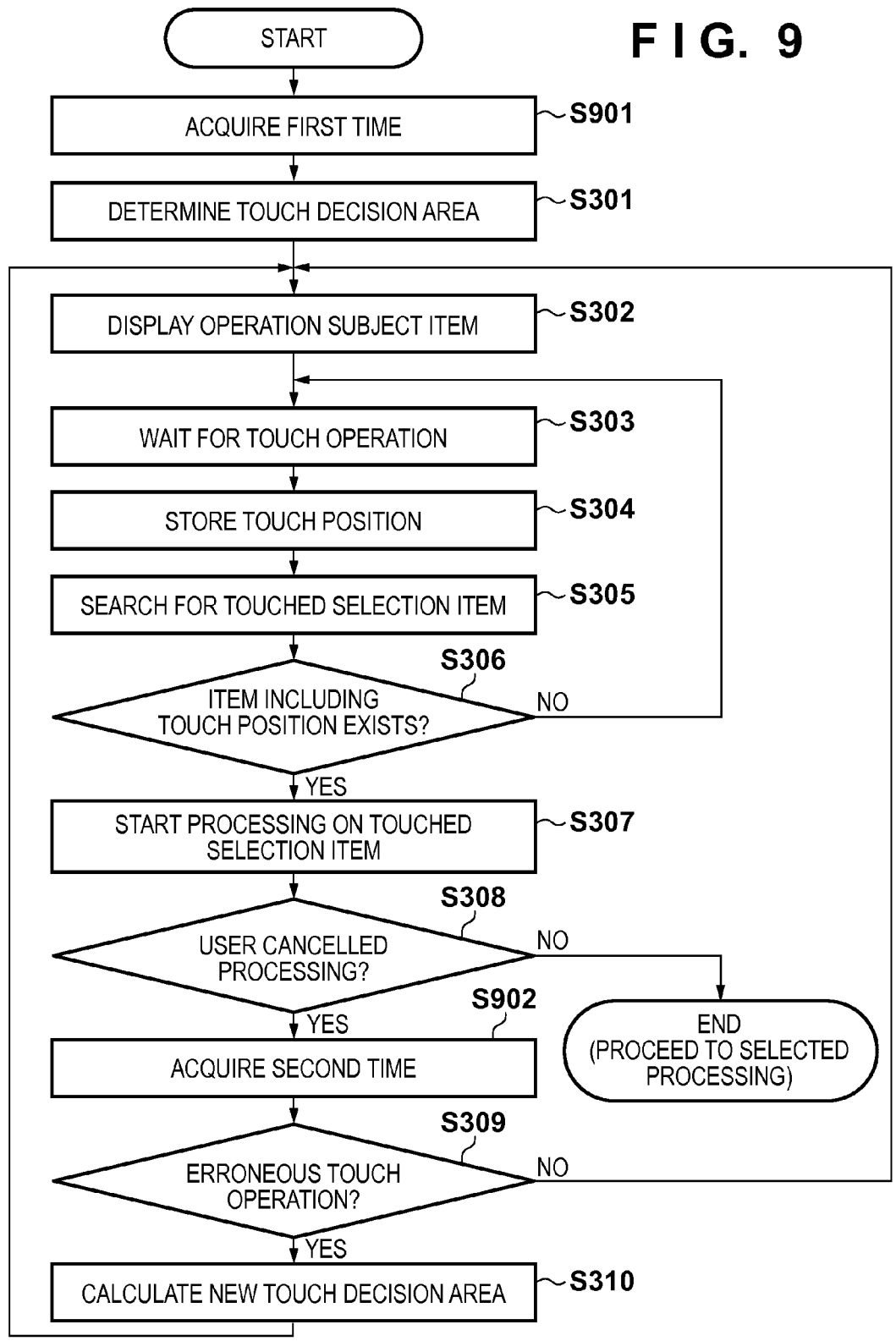

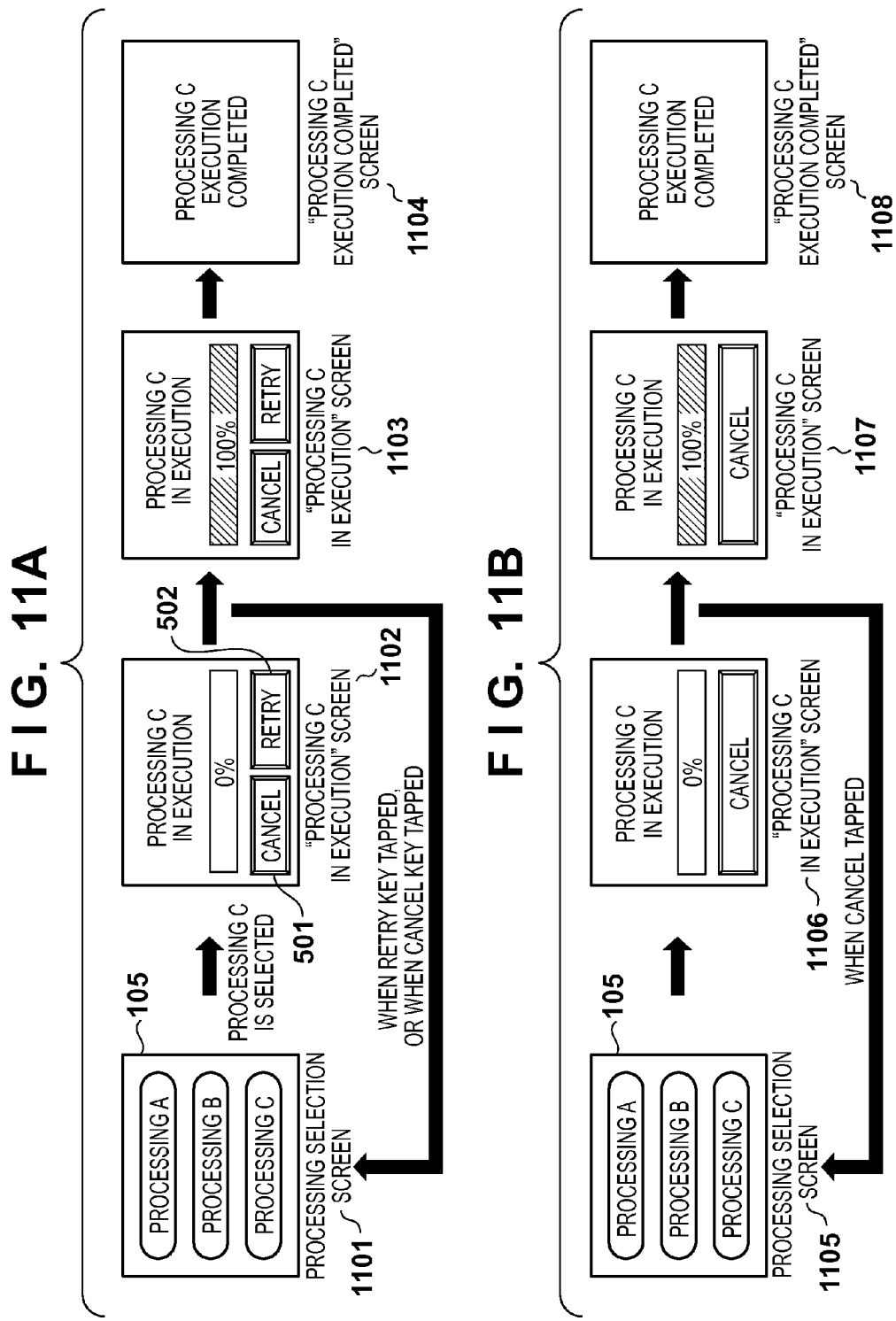

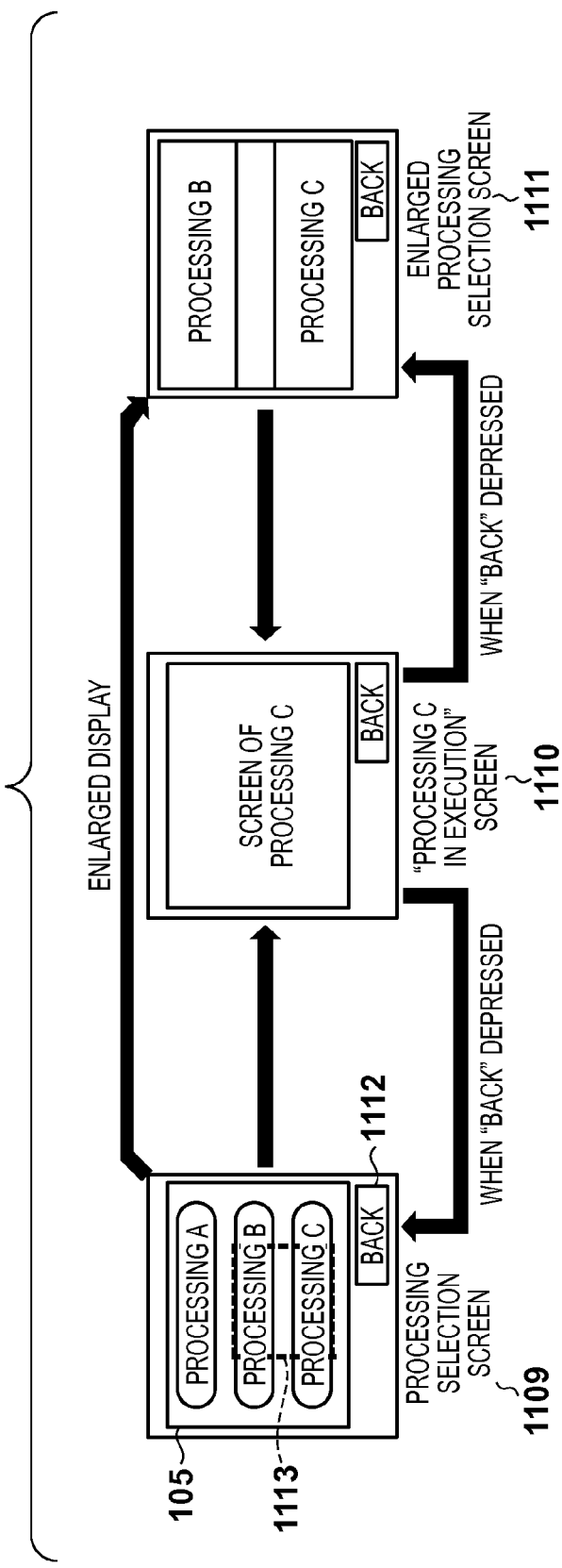

FIG. 16A
SCREEN ID: 0002
SCREEN ID: 0001
NUMBER OF ITEMS: 3
| ITEM | WIDTH | HEIGHT | POSITION |
|---|---|---|---|
| PROCESSING A | 160px | 40px | 20, 20 |
| PROCESSING B | 160px | 40px | 20, 80 |
| PROCESSING C | 160px | 40px | 20, 140 |
FIG. 16B
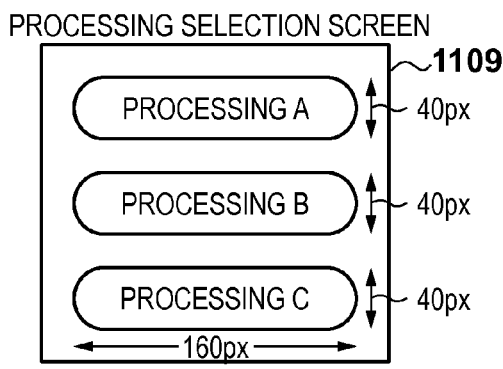
PROCESSING SELECTION SCREEN
FIG. 16C
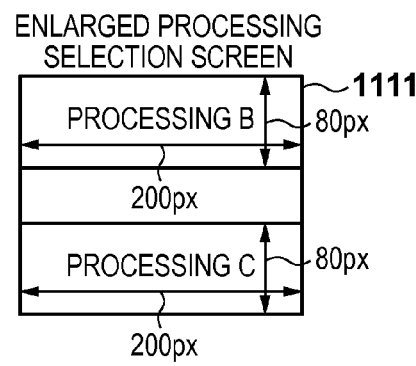
ENLARGED PROCESSING SELECTION SCREEN
FIG. 16D
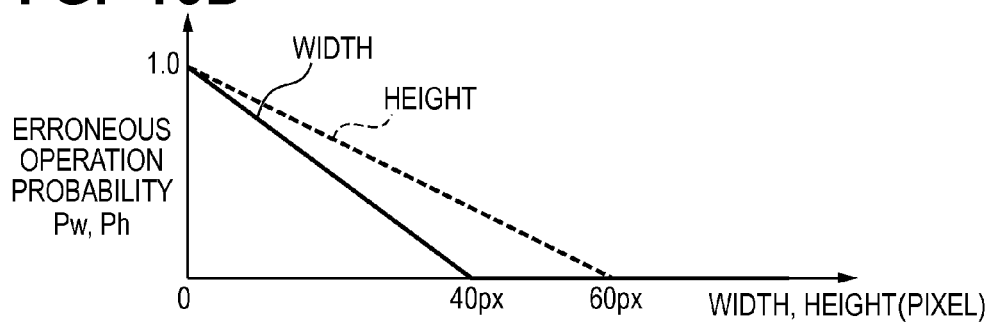
FIG. 16E
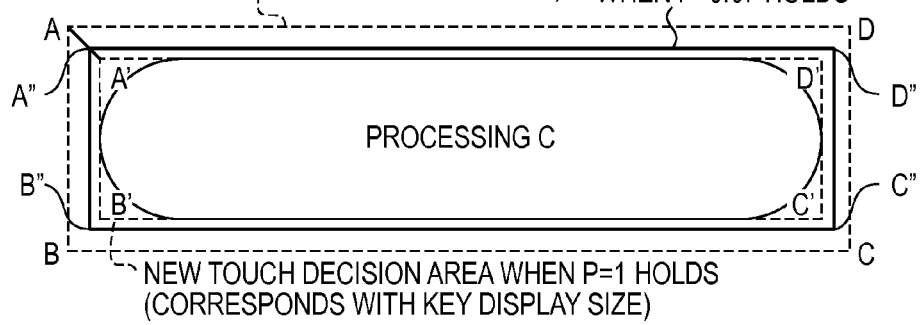

ELECTRONIC DEVICE, INFORMATION PROCESSING APPARATUS AND CONTROL METHOD THEREFOR

BACKGROUND OF THE INVENTION

Field of the Invention

The present invention relates to an electronic device having a touch panel, an information processing apparatus and a control method therefor.

Description of the Related Art

In recent years, display devices such as a liquid crystal display have an improved display screen resolution. It is possible to display even small characters without impairment of visibility.

Similarly, the accuracy of coordinate detection in a touch panel has been improved. However, in the case of a touch panel detecting a position where an operator's finger touches, operability is an important problem. Even though it is possible to display a large number of selection items on a display screen, since the contact with a fingertip is not a point contact but an area contact, it is difficult to select a desired item with a fingertip.

To improve the operability, enlarging the display screen such that the size of items are relatively larger with respect to a touched area in order to facilitate selection is employed as a standard function in mobile phones called smart phones and PHS (Personal Handyphone System) devices. Further, generating and displaying an arrow-shaped pointer not hidden with a fingertip from the touch point so as to improve the operability by operating the pointer is known (e.g., Japanese Patent Laid-Open No. 2009-245239). Further, searching for a combination of erroneously-selected item and correctly-selected item from processing records upon touch panel operation, then when the same operation screen appears, updating the relation between a selection item and a touch position is proposed (Japanese Patent Laid-Open No. 2010-55225).

However, in the method of enlarging and displaying a display screen and the method of generating an arrow-shaped pointer, it is necessary for the operator to be skilled at the operation. Further, considering the characteristic properties of the touch panel, it is impossible to eliminate the probability of mis-selection of an item different from a desired item at the instant of release of the finger. Further, regarding the method of changing the relation between an item and a touch position using processing records, it is necessary for the user to conduct correct processing at least once.

SUMMARY OF THE INVENTION

The present invention has been made in view of the above-described problems. This disclosure provides a technique of, when a touch panel is operated and erroneous processing is performed, reducing the probability of the same operation error, thus improving the operability.

To attain the above object, an electronic device according to this disclosure has the following structure.

That is, provided is an electronic device having a display device, and a touch panel, provided in front of a display screen of the display device, to detect an operator's touch position, comprising: a storage unit to hold decision area information indicating a decision area to decide selection of an item as a selection subject to be displayed on the display screen; a display control unit to control the display device to display respective items; a control unit to, when a touch to the touch panel is detected, determine a selected item by referring to the storage unit and determining a decision area which the touch position belongs to, and perform processing corresponding to the determined selected item, wherein the control unit has: a determination unit to, when the processing corresponding to the selected item is started, determine whether or not a designation input indicating that selection of the processing-started item was not intended by the operator has been made; and an update unit to, when the determination unit determines that the designation input has been made, update corresponding decision area information in the storage unit so as to narrow the decision area of an item corresponding to the started processing.

According to the present invention, when a touch pane is operated and erroneous processing is performed, it is possible to reduce the probability of the same operation error.

Further features of the present invention will become apparent from the following description of exemplary embodiments (with reference to the attached drawings).

BRIEF DESCRIPTION OF THE DRAWINGS

FIG. 7 is an example of selection decision information;

FIG. 8 is a block diagram showing the functional configuration of the electronic device according to a third embodiment;

FIG. 9 is a flowchart showing the flow of the processing according to the third embodiment;

FIGS. 11A to 11C are explanatory diagrams showing transition of the screen according to the fourth embodiment;

FIGS. 16A to 16E are schematic diagrams explaining the touch decision area update method according to the fifth embodiment of the present invention;

DESCRIPTION OF THE EMBODIMENTS

Figure 1:
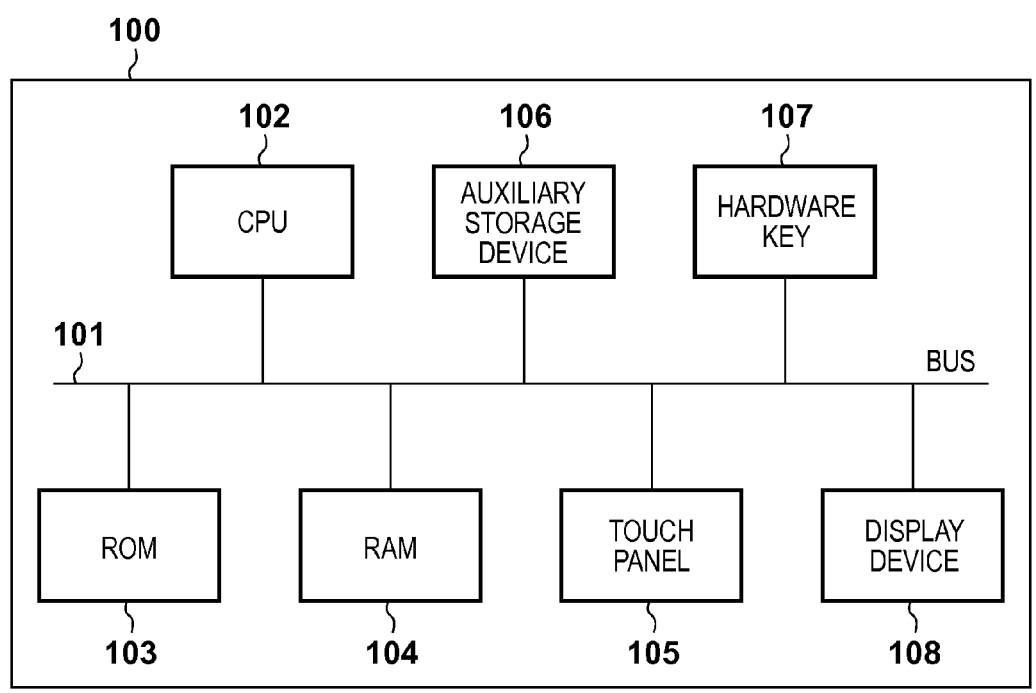
FIG. 1 is a block diagram showing a hardware configuration of an electronic device according to an embodiment.

Hereinbelow, embodiments of the present invention will be described in detail in accordance with the attached drawings. Note that the following embodiments do not limit the present invention in claims. Further, all the combinations of characteristic features described in the respective embodiments are not necessarily essential to solution means of the present invention. Note that the identical constituent elements have the same reference numerals.

First Embodiment

FIG. 1 is a block diagram showing a hardware configuration, mainly regarding a touch panel, in an electronic device having a display device and the touch panel provided in front of the display screen according to a first embodiment of the present invention. As an electronic device having a display device and a touch panel, various devices such as a so-called smart phone and a digital camera can be used, regardless of device type. When the present invention is applied to a smart phone, the device has communication-related hardware and conversation-related hardware in addition to the constituent elements in the drawings. However, as these hardware constituent elements are not directly related to the present invention, they are not shown for the sake of simplicity of explanation.

In FIG. 1, an electronic device 100 has a bus 101, a CPU 102, a ROM 103, a RAM 104, a touch panel 105, an auxiliary storage device 106, a hardware key 107, and a display device 108. The CPU 102 performs and controls respective functions. The ROM 103 holds invariable programs and various parameters. The RAM 104 having an SDRAM, a DRAM or the like temporarily holds programs and data supplied from an external device or the like. The touch panel 105 detects a position designated with a user's fingertip. The coordinates may be detected by any method. The touch panel 105 is formed with a light-transmitting material. The auxiliary storage device 106 is writable and nonvolatile even upon stoppage of power supply. The auxiliary storage device 106 is e.g. a hard disk drive or a flash memory. The hardware key 107 receives the user's operation, and notifies the CPU 102 of interruption. Then the CPU 102 performs predetermined interruption processing. The display device 108 has a display controller to control a liquid crystal display and an EL display unit and perform processing for display on the display devices under the control of the CPU 102. The touch panel 105 is provided in front of the display screen of the display device 108. Accordingly, when viewed from the operator, the touch panel 105 is operated with a feeling of touch on the display screen. The bus 101 is a system but connecting the CPU 102, the ROM 103, the RAM 104, the touch panel 105, the auxiliary storage device 106, the hardware key 107 and the display device 108.

Figure 2:
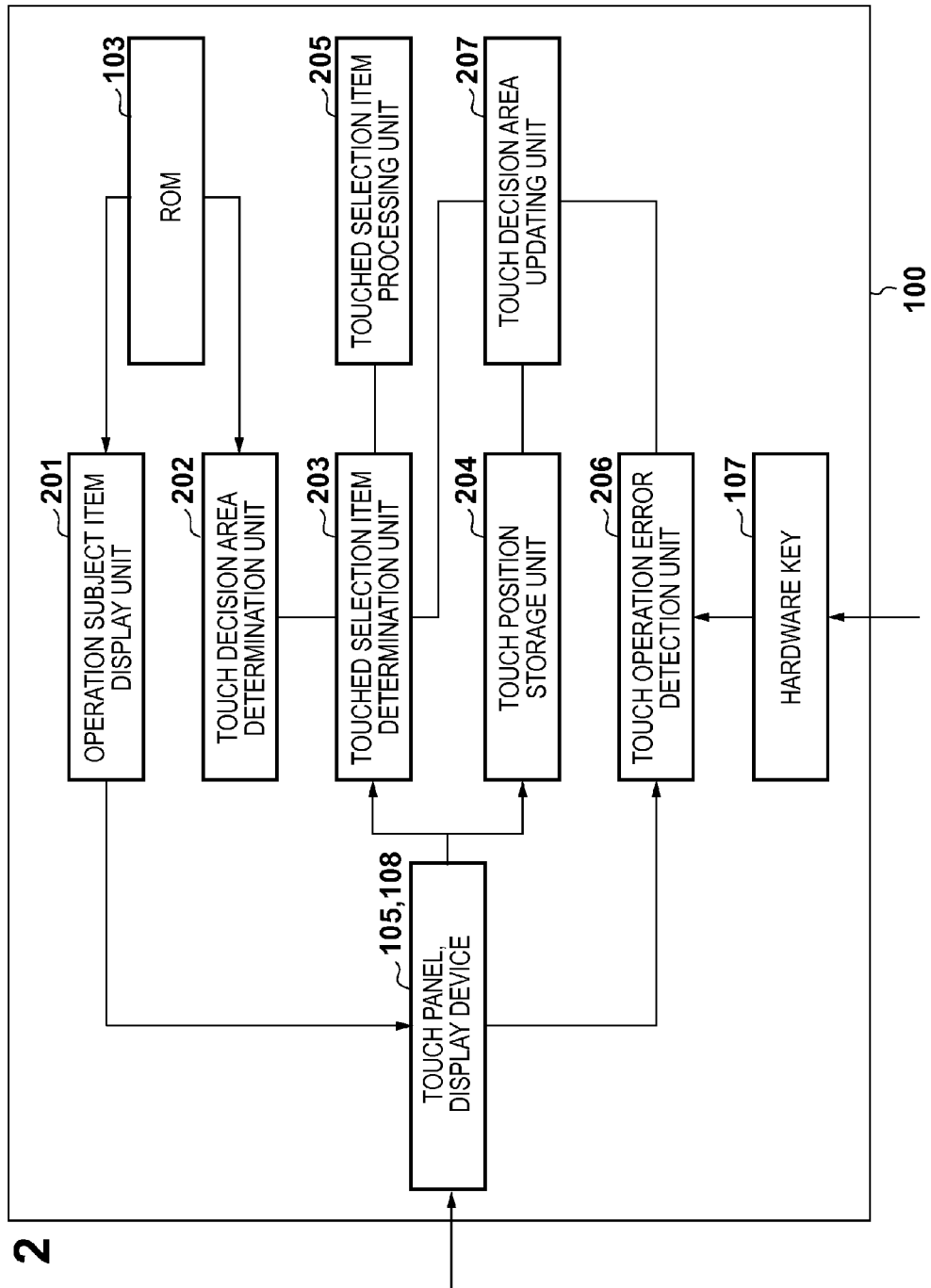
FIG. 2 is a block diagram showing a functional configuration of the electronic device according to the embodiment.
Figure 3:
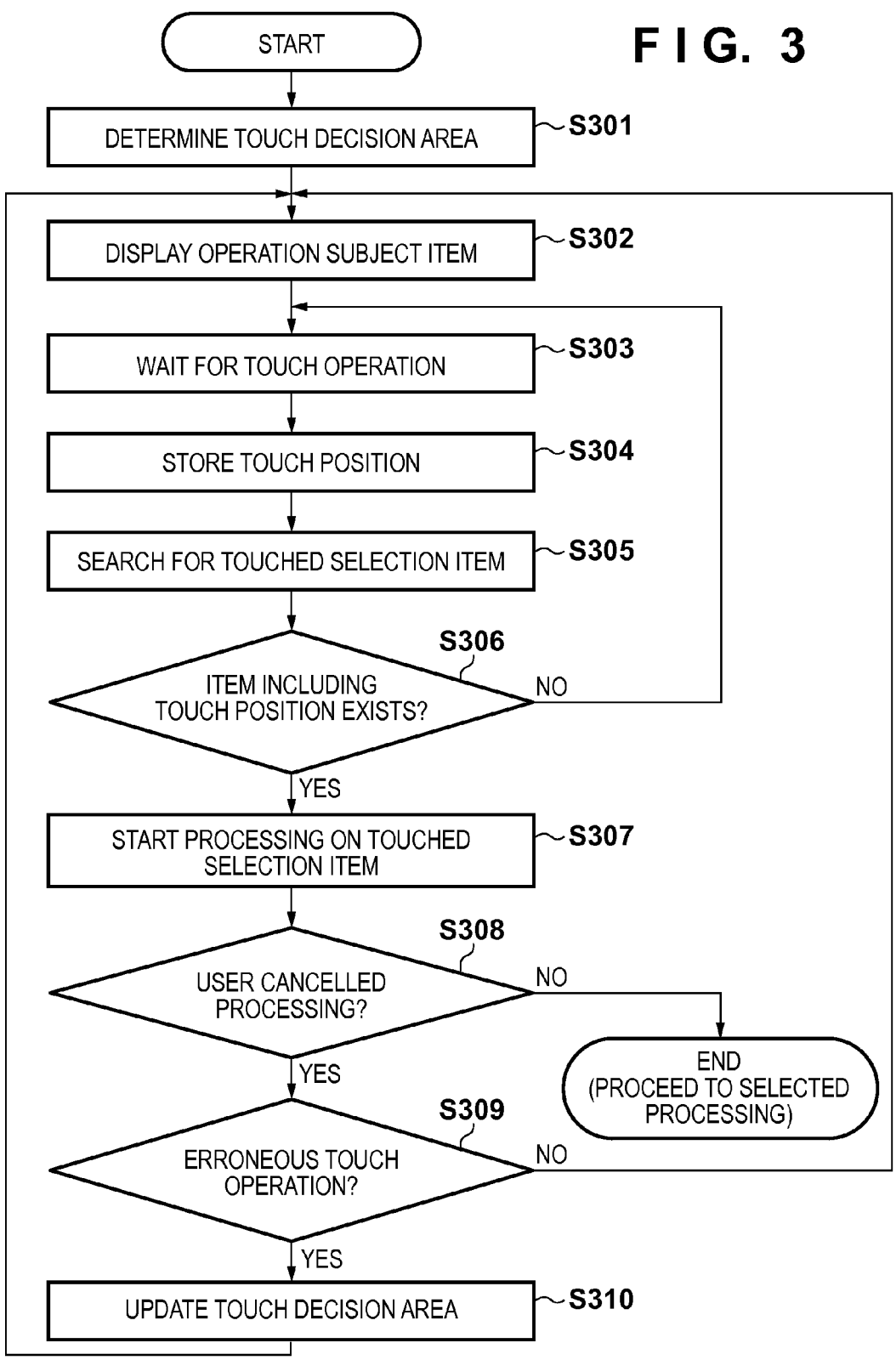
FIG. 3 is a flowchart showing the flow of processing according to the first embodiment.

Next, the flow of processing related to the touch panel operation in the electronic device, to which the present embodiment is applied, will be described with reference to the block diagram of FIG. 2 showing the functional configuration and the flowchart shown in FIG. 3. Note that in the functional configuration block diagram of FIG. 2, reference numerals 201 to 206 denote respective functions performed with the CPU 102 upon execution of a program loaded to the RAM 104 or the ROM 103. Further, in the auxiliary storage device 106, a storage area is allocated in advance for storing information related to selection decision of items in respective menu screens, displayed in various processings, to be described later. FIG. 7 shows an example of decision area information of a candidate among respective menus held in the auxiliary storage device 106. Since the types of displayed menu items, the form of display (layout etc.) and the number of menu items depend on each menu, a menu ID is assigned to each menu. In each menu, the decision area information includes the number of items as selection subjects to be displayed, information to specify each item, and coordinate data corresponding to each item, indicating a decision area for decision of selection. In this example, the decision area information is stored in advance; however, the data may be generated from displayed contents. The coordinate data, having plural coordinate data (e.g. coordinates of respective points forming an area with a closed loop), can be initialized with a predetermined user operation. The initial status may be the status upon shipment from a factory. Otherwise, when the user downloads an application, the status upon downloading may be the initial status. For the sake of simplicity of explanation, in the following description, the coordinate data of the respective selection items are in the initial status.

First, the CPU 102 reads menu information related to display from the ROM 103, then reads a corresponding menu ID from the read menu information, and determines selection decision information (see FIG. 7) of the corresponding menu in the auxiliary storage device 106. Then, the CPU 102 reads the information and determines a touch decision area for each selection subject item (S301). Next, the CPU 102 controls the display device 108 to display operation subject items based on layout information of the menu stored in the ROM 103 (S302). This processing corresponds to processing with an operation subject item display unit 201.

Figure 4A:
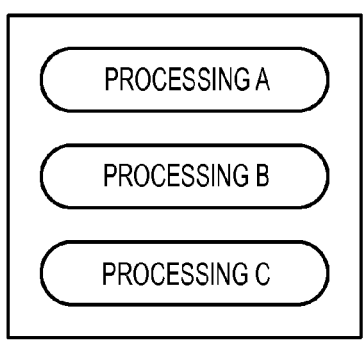
FIGS. 4A to 4E are schematic diagrams showing the relation between a display screen and a touch decision area.
Figure 4B:
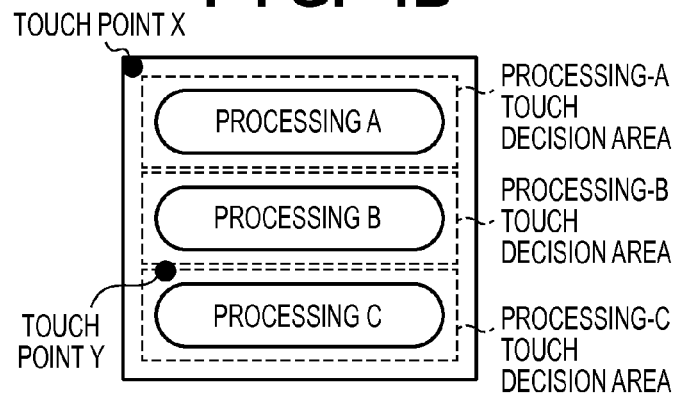

FIG. 4A shows an example of contents displayed on the display screen in the rear of the touch panel 105. In the figure, as selection items, a "Processing A" key, a "Processing B" key and a "Processing C" key are displayed. FIG. 4B shows an example where the touch decision area determined at step S301, indicated with a dotted line, is superimposed on the example displayed on the display screen. The touch decision areas for the respective items have a shape including the shape of the key and not in contact with the shape of the key. It may be arranged such that the touch decision area has the shape of the key or a polygonal shape including the shape of the key.

Next, the CPU 102 waits for the user's touch operation on the touch panel 105 and selection of processing item (S303). This processing corresponds to a touch decision area determination unit 202. When the touch operation is detected, a touch position storage unit 204 temporarily stores information indicating the coordinates of the touched position on the touch panel 105 into the RAM 104 (S304). Further, a touched selection item determination unit 203 searches for an operation subject item having a touch decision area including the touched coordinates (S305). It is determined whether or not an operation subject item having a decision area including the touch point exists (S306). When it is determined that no operation subject item having a decision area including the touch point exist, the process returns to step S303, to wait until a touch operation is performed again. For example, in FIG. 4B, assuming that a touch point X is designated, the touch point X is not included in any of the touch decision areas of the processing A, the processing B and the processing C. Accordingly, it is determined that there is no operation subject item having a touch decision area.

Figure 5A:
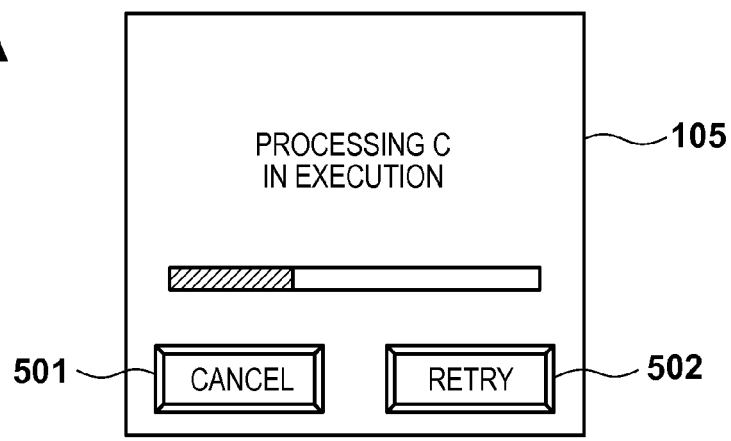
FIGS. 5A to 5C are examples of the screen indicating that a selected item is being processed.

On the other hand, when a touch position exists in the decision area of any of the processing items (YES at step S306), the CPU 102 starts processing on the touched operation subject item (S307). This processing corresponds to a touched selection item processing unit 205. In FIG. 4B, as a touch point Y is included in the touch decision area of the processing C, when the touch point Y is touched, the processing C is performed. FIG. 5A is a display example showing the progress of the processing C in execution. In this example, the display has a cancel key 501 and a retry key 502 such that the user can input abortion designation in the middle of the processing C by touch-operating the screen. The cancel key 501 is used for informing the apparatus of the abortion of the processing C. Further, the retry key 502 is used for notifying the apparatus that the user has not intended to select the processing C, in addition to the notification of the abortion of the processing C to the apparatus. Note that the display in FIG. 5A is produced upon designation of another menu or another selection item, but the display is not specific to the processing C.

FIG. 11A is an explanatory diagram of transition of the screen in the present embodiment. The display screen shown in FIG. 4A corresponds to a processing selection screen 1101 in FIG. 11A. When it is determined that the key of the processing C has been selected in the processing selection screen, the screen changes to a "processing C in execution" screen 1102. In the present embodiment, a progress bar indicating the execution progress of the processing C is arranged in an upper position of the screen. The screen transition advances automatically from the "processing C in execution" screen 1102 to a "processing C in execution" screen 1103, then when the processing C is completed, the screen changes to a "processing C execution completed" screen 1104. The display screen shown in FIG. 5A is a display screen at some timing between the "processing C in execution" screen 1102 and the "processing C in execution" screen 1103. The cancel key 501 and the retry key 502 are displayed from the "processing C in execution" screen 1102 to the "processing C in execution" screen 1103. When one of the keys is touched, the processing C is aborted and the process returns to the processing selection screen 1101. Note that in FIG. 11A, screen transition in other cases than the selection of the processing C is omitted.

As described above, in the screen shown in FIG. 5A, when the user touches the cancel key 501 or the retry key 502 during the processing of the operation subject item started at step S307, it is determined that the user has canceled the processing (S308), and the processing C is aborted. Note that it may be arranged such that the touch decision is made not by determining whether or not touch has been made during the processing of the operation subject item but by determining whether or not the cancel key 501 or the retry key 502 has been touched within a predetermined period from the previous touch (touch operation at step S303). Next, a touch operation error detection unit 206 determines whether or not the selection of the processing C at step S303 matched the user's intention (S309). When the cancel key 501 has been touched, it is determined that the selection was intended by the user but the processing has been aborted, and the process returns to step S302. Further, when the retry key 502 has been touched, it is determined that processing not intended by the user was started. In this case, a touch decision area update unit 207 calculates a new touch decision area, and based on the result, updates a decision area of corresponding processing (coordinate data of the "processing C" decision area shown in FIG. 7) (S310). More particularly, the touch decision area update unit 207 updates the coordinate data so as to narrow the decision area to exclude the touch position from the border of the processing C decision area.

In the above description, the display in FIG. 5A is also utilized when other menu or other selection item is designated.

In this example, it is determined whether or not the selection matched the user's intention by using the two logical display keys displayed on the touch panel 105 during execution of the processing C, however, the determination may be made by other method.

Figure 5B:
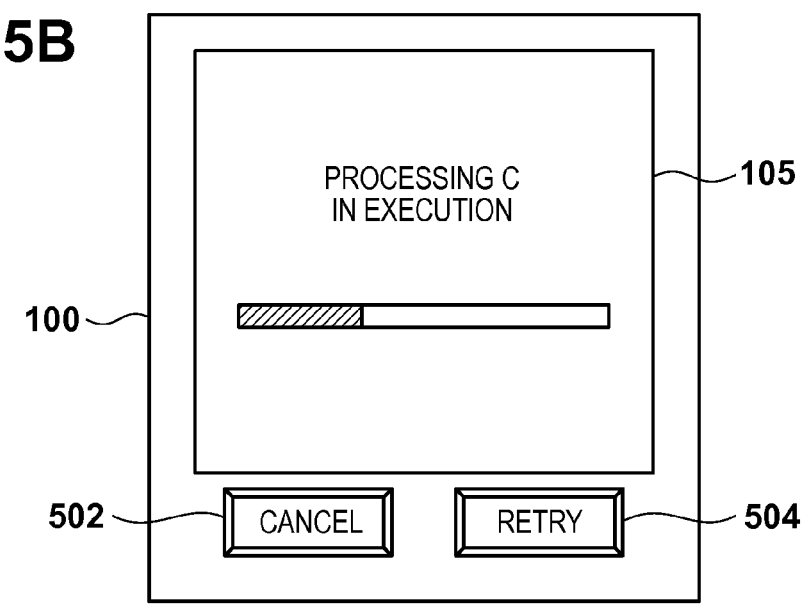

FIG. 5B shows an example where a cancel hardware key 503 and a retry hardware key 504 are arranged outside the touch panel 105. In FIG. 2, the input of the hardware key 107 issues an interruption request to the CPU 101 and notifies the touch operation error detection unit 206 of the type of the hardware key. When the cancel hardware key 503 has been touched, it is determined that the selection was intended by the user but the processing has been aborted. When the retry key 502 has been touched, it is determined that the selection was not intended by the user.

Figure 5C:
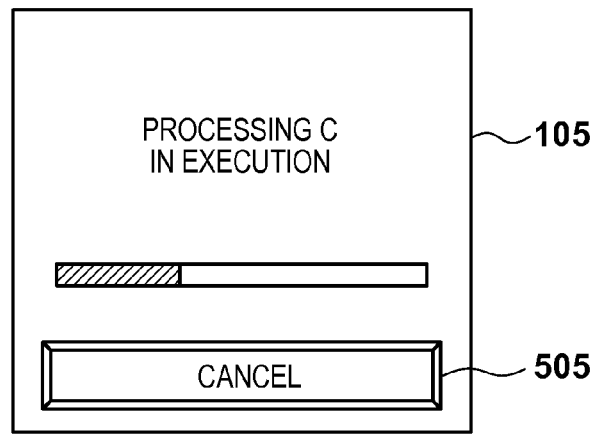

Further, as shown in FIG. 5C, when a cancel key 505 is arranged on the touch panel 105 and when the selection was not intended by the user, notification may be made with operation of the touch panel by a predetermined method. For example, it may be arranged such that when the cancel key 505 is touched once, it is determined that the selection was intended by the user but the processing has been aborted. When the touch is detected a predetermined number of times (e.g., twice) within a predetermined period, it is determined that the selection was not intended by the user. Further, it may be arranged such that the user's intention is analogized and decided based on the timing of the touch of the cancel key 505. For example, it may be arranged such that when the cancel key 505 is touched within a predetermined period since the start of the processing C, it is determined that the execution of the processing C was not intended by the user. Further, it may be arranged such that when the key cancel key 505 is touched before the completion of the processing C, it is determined that the selection was not intended by the user. Further, the key may be realized with a hardware key in place of the key on the touch panel 105. Further, it may be arranged such that when the user's intention is analogized, as long as the display scale of the selected item displayed on the touch panel 105 has a predetermined or higher value, the decision of operation error is avoided.

Next, the processing by the touch decision area update unit 207 will be described regarding a case where the touch point Y is touched in FIG. 4B. In FIG. 4B, the touch point Y is included in the processing-C touch decision area.

Figure 4C:
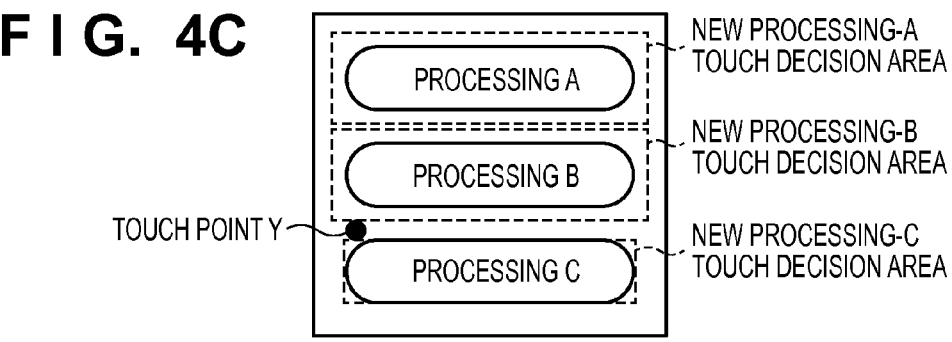

FIG. 4C shows an example where, as a result of determination that the processing C was not intended by the user, the touch decision area update unit 207 reduces the processing-C touch decision area. The processing-C touch decision area in FIG. 4B is a rectangular area including the shape of the key and not in contact with the shape of the key. In this example, the touch decision area is reduced, and it includes the shape of the key and in contact with the shape of the key. In this example, two-stage touch decision area update is explained. Further, the number of stages may be increased, or the decision area may be changed based on a predetermined reduction ratio. Further, it may be arranged such that the decision area may be reduced not to include the touch position stored in the touch position storage unit 204.

Figure 4D:
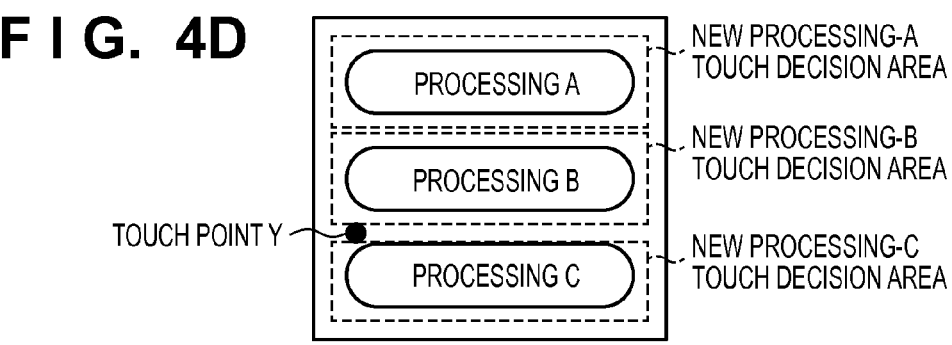
Figure 4E:
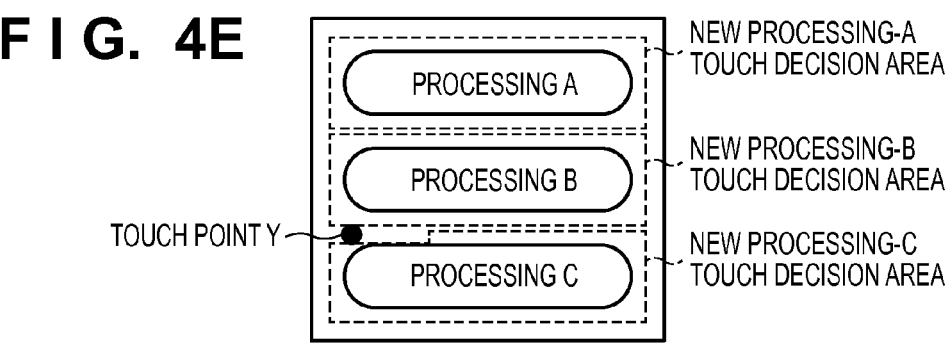

Further, FIG. 4D shows an example where the touch decision area is updated based on the touch position stored in the touch position storage unit 204. In FIG. 4D, the processing-C touch decision area is deformed into a rectangular area not to include the touch point Y. That is, the position of one side of the rectangular area is changed. Further, the touch decision area may be deformed into other figure than a rectangle as shown in FIG. 4E.

By the processing control as described above, even when the same touch position or near position is touched, the processing C that does not match the user's intention is not executed. Further, as the decision area of each selection item of the menu is stored in the nonvolatile storage device, the learning effect is not lost even when the power is stopped.

Second Embodiment

In the above-described first embodiment, the method of updating the touch decision area of the selected item determined with the touched selection item determination unit 203 has been explained. Further, another method of updating the touch decision area of the selected item will be described.

Figure 6A:
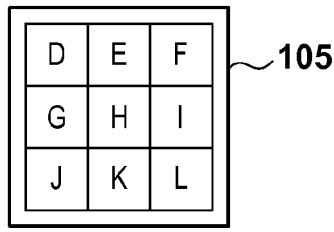
FIGS. 6A to 6E are schematic diagrams showing the relation between the display screen and the touch decision area according to a second embodiment.
Figure 6B:
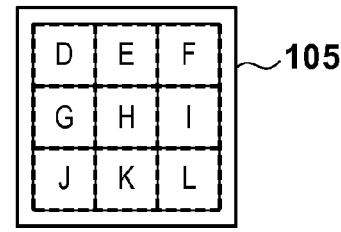
Figure 6C:
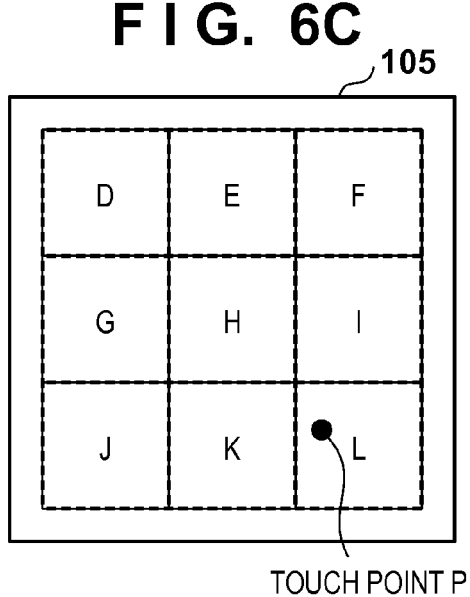

The hardware configuration and the functional configuration of the second embodiment are the same as those described in the first embodiment, therefore the explanations thereof will be omitted. As the flow of the processing is the same as that shown in FIG. 3, therefore, in the second embodiment, it will also be described using FIG. 3. CPU 102 determines the touch decision area at step S301, and displays the operation subject item at step S302. FIG. 6A is an example of a screen displayed on the touch panel 105. Alphabets D to L denote rectangular keys as touch selection items. When they are touched, processing D to processing L are executed. FIG. 6B shows an example where the touch decision area determined at step 301 in FIG. 3, indicated with a dotted line, is superimposed on the example displayed on the touch panel 105. The touch decision areas of the respective items correspond to the shapes of the keys. Next, the process waits until the touch operation is made at step S303, then the touched position is stored at step S305. In this example, a touch point P shown in FIG. 6C is the touched point. As the touch point P is included in the processing-L touch decision area, the processing L is started at step S307.

Next, the processing when the user cancels the processing L (S308) and it is determined that the touch operation did not match the user's intention (S309) will be described.

Figure 6D:
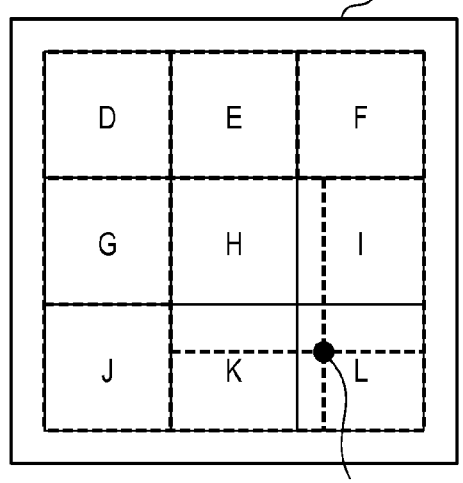
Figure 6E:
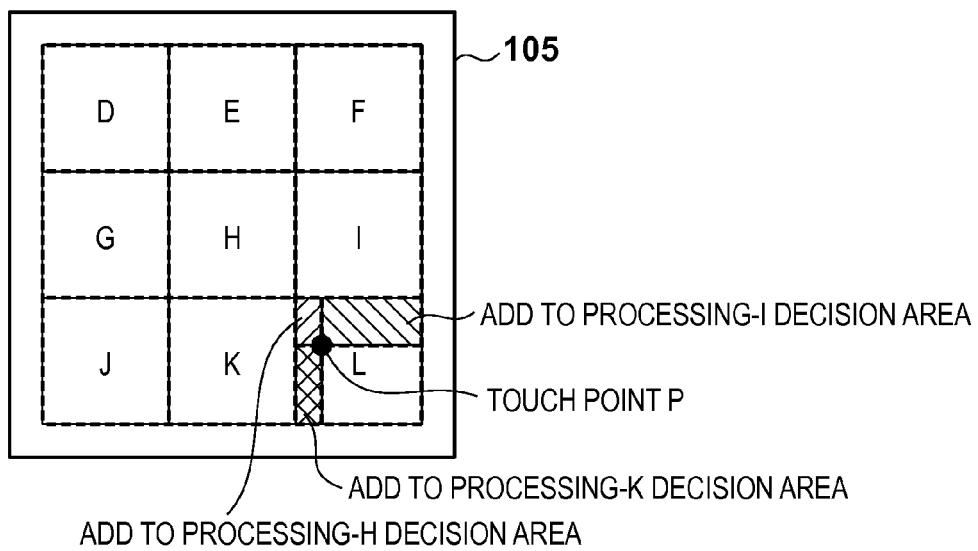

First, processing having a touch decision area adjacent to the touch decision area including the touch point (processing L) is obtained. In this example, the processing-H touch decision area, the processing-I touch decision area and the processing-K touch decision area are the adjacent areas. Next, the touch point P is set on the border among new touch decision areas of the processing H, the processing I, the processing K and the processing L. That is, it is arranged such that the border position of the processing-H touch decision area, the processing-I touch decision area, the processing-K touch decision area and the processing-L touch decision area pass through the touch point. FIG. 6D shows an example where the touch decision area is deformed to have a rectangular shape at this time. Further, it may be arranged such that the processing-L touch decision area is divided with reference to the touch point P and the added to the processing-H touch decision area, the processing-I touch decision area and the processing-K touch decision area. FIG. 6E shows an example of the touch decision areas subjected to another touch decision area update method, where the processing-L touch decision area is divided into four rectangular areas with reference to the touch point P and added to adjacent touch decision areas. In FIG. 6E, the updated processing-H touch decision area has plural areas.

Note that when the touch decision areas of the selection items adjacent to the selected item are deformed to complicated shapes, it may be arranged such that the touch decision areas are superimposed on the display screen so as to assist the user's operation.

By the processing control as described above, even when the same touch position or its near position is touched, the processing H that does not match the user's intention is hardly executed. Further, it is possible to easily select the processing intended by the user.

Third Embodiment

In the above-described first embodiment, it is determined whether or not the selection matched the user's intention by using the two logical display keys displayed after the transition of the screen. Further, another method of determination will be described.

As the hardware configuration of the third embodiment is the same as that described in the first embodiment, the explanation thereof will be omitted.

The flow of the processing related to the touch panel operation in the electronic device to which the third embodiment is applied will be described with reference to the block diagram of FIG. 8 showing the functional configuration, the flowchart of FIG. 9 according to the third embodiment and the screen transition shown in FIG. 11B.

FIG. 11B shows the screen transition according to the third embodiment. When the user selects the processing C in a processing selection screen 1105, the screen changes to a "processing C in execution" screen 1106 and the processing C is started. The progress of the processing C is displayed with a progress bar. Upon completion of the processing, the screen is changed to a "processing C in execution" screen 1107, and the screen changes to a "processing C execution completed" screen 1108.

FIG. 5C is a display screen at some timing between the "processing C in execution" screen 1106 and the "processing C in execution" screen 1107. During the execution of the processing C, when the cancel key 505 is tapped, the processing C is aborted and the processing selection screen 1105 is restored.

First, a first time acquisition unit 801 acquires first time stored in the ROM 103 (S901). The first time is used as reference time for determination as to whether or not the operation was an erroneous operation, i.e., a threshold value. As the following steps S301 to S306 are identical to those described in the first embodiment, the explanations thereof will be omitted. At step S306, the processing selection screen 1105 in the screen transmission diagram is displayed. Next, at step S307, the processing C is executed and the screen changes to the "processing C in execution" screen 1106. Next, at step S308, it is determined whether or not the user has tapped the cancel key 505. Next, at step S902, a second time acquisition unit 802 measures time since the transition to the "processing C in execution" screen to the abortion as second time, and stores the measured time in the RAM 104. Next, at step S309, the first time and the second time are compared with each other. When it is determined that the second time is shorter than the first time, it is determined that the operation was an erroneous operation. When it is determined at step S309 that the operation was an erroneous operation, the process proceeds to step S310. The processing at step S310 is as described in the first embodiment.

When the user aborts the processing at once, there is a high probability that the operation was not intended by the user. In such case, by the processing control as described above, when the same touch position or near position is touched, the processing C that does not match the user's intention is hardly executed. Further, it is possible to easily select the processing intended by the user.

Fourth Embodiment

In the third embodiment, the method of determining whether or not the operation matched the user's intention based on the time from the start of processing to the abortion. In this embodiment, a method of calculating the probability of erroneous operation will be described.

Since the hardware configuration of the fourth embodiment is the same as that described in the first embodiment, the explanation thereof will be omitted.

Figure 14:
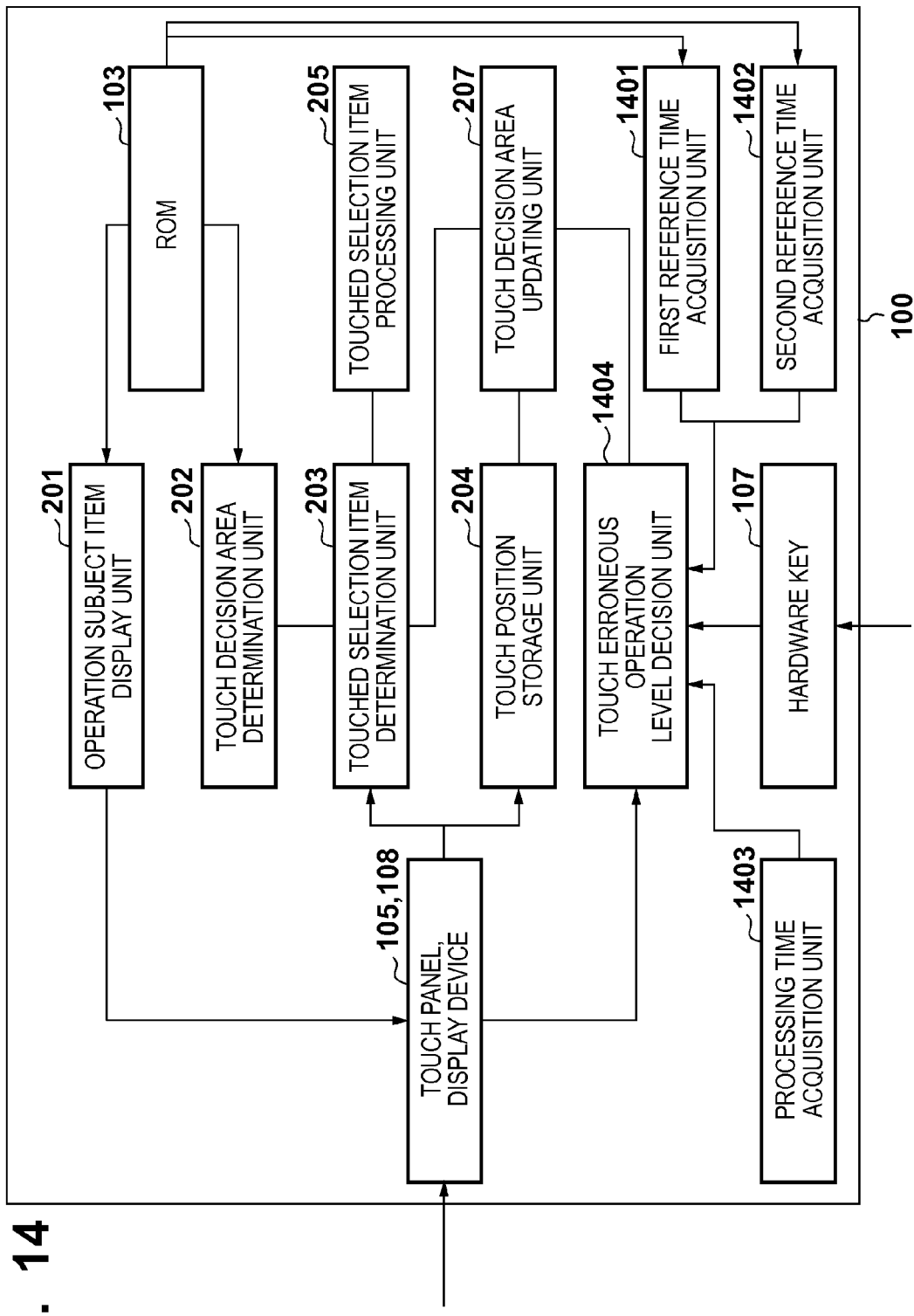
FIG. 14 a block diagram showing the functional configuration of the electronic device according to a fourth embodiment.
Figure 15:
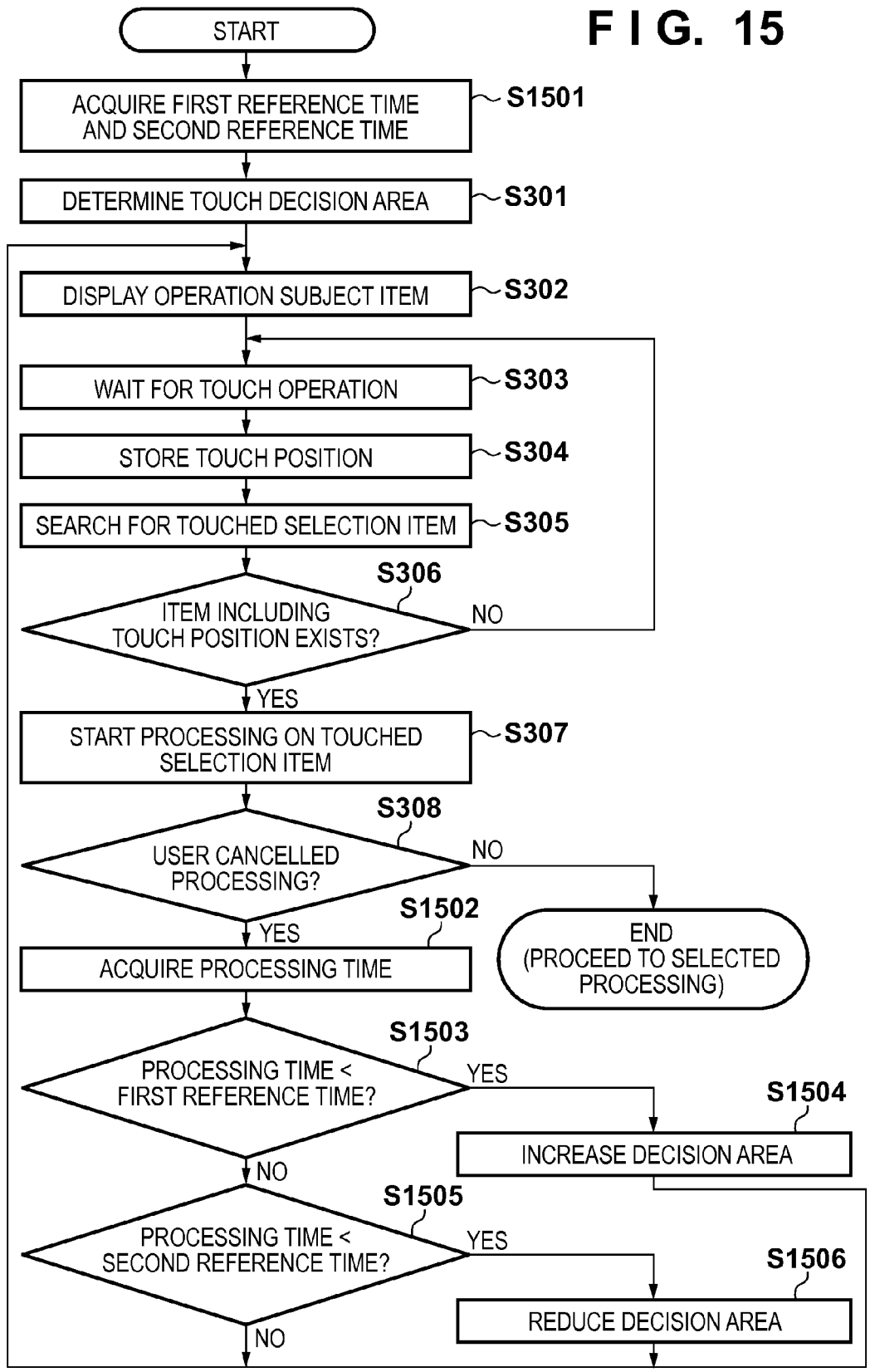
FIG. 15 is a flowchart showing the flow of the processing according to the fourth embodiment.

The flow of the processing related to the touch panel operation in the electronic device to which the fourth embodiment is applied will be described with reference to the block diagram of FIG. 14 showing the functional configuration and the flowchart of FIG. 15 according to the present embodiment. Note that as the screen transition diagram is similar to FIG. 11B shown in the third embodiment, the description will be made with reference to FIG. 11B.

First, a first reference time acquisition unit 1401 and a second reference time acquisition unit 1402 acquire first reference time and second reference time stored in the ROM 103 (S1501). The first reference time and the second reference time are used as reference for determination of error level. The first reference time is shorter than the second reference time. Since the following steps S301 to S306 are identical to those described in the first embodiment, the explanations thereof will be omitted. At step S306, the processing selection screen 1105 in the screen transition diagram is displayed. Next, at step S307, the processing C is executed, and the screen changes to the "processing C in execution" screen 1106. Next, at step S308, it is determined whether or not the user has tapped the cancel key 505. Next, at step S1502, a processing time acquisition unit 1403 measures time from the transition to the "processing C in execution" screen to the abortion as processing time, and stores the time into the RAM 104. Next, at step S1503, a touch erroneous operation level decision unit 1404 compares the processing time with the first reference time. When it is determined that the processing time is shorter than the first reference time, the process proceeds to step S1504, at which the touch decision area update unit 207 increases the touch decision area. When it is determined that the processing time is not shorter than the first reference time, the process proceeds to step S1505, at which the touch operation error detection unit 206 compares the processing time with the second reference time. When it is determined that the processing time is shorter than the second reference time, the process proceeds to step S1506, at which the touch decision area update unit 207 reduces the touch decision area. After the completion of steps S1504 and S1506, or when it is determined at step S1505 that the processing time is not shorter than the second reference time, the process returns to step S302.

Figure 10A:
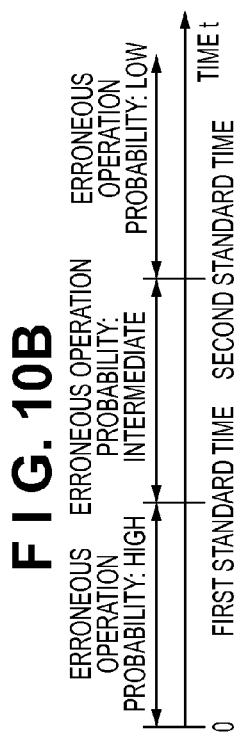
FIGS. 10A to 10F are schematic diagrams explaining a touch decision area update method according to a fourth embodiment.
Figure 10B:
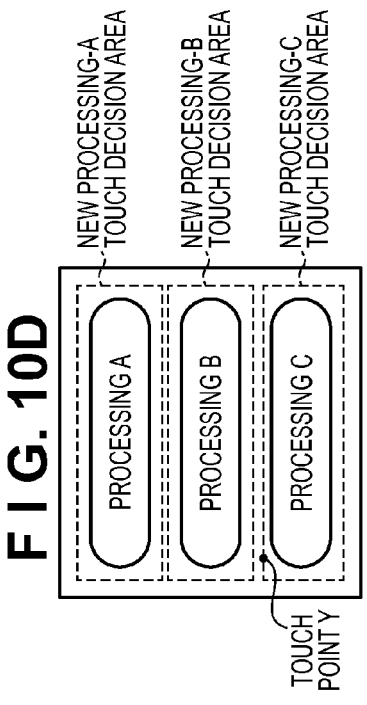

Next, the processing at steps S1504 and S1506 will be described in detail using the drawings. FIG. 10A is a schematic diagram showing a status where the touch decision area in an initial status is superimposed on the display screen. The touch point Y is included in the processing-C touch decision area. FIG. 10B shows three-level classification of erroneous operation probability using the first reference time and the second reference time. The processing at step S1504 is performed when it is determined in FIG. 10B that the probability of erroneous operation is high. The processing at step S1506 is performed when it is determined that the probability of erroneous operation is intermediate. When it is determined at step S1505 that the processing time is not shorter than the second reference time, it is determined that the probability of erroneous operation is low.

Figure 10C:
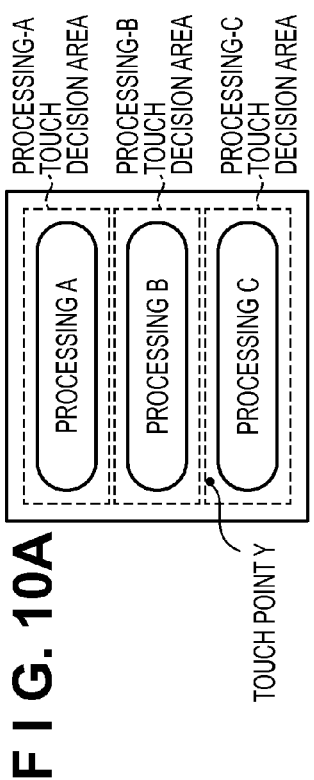
Figure 10D:
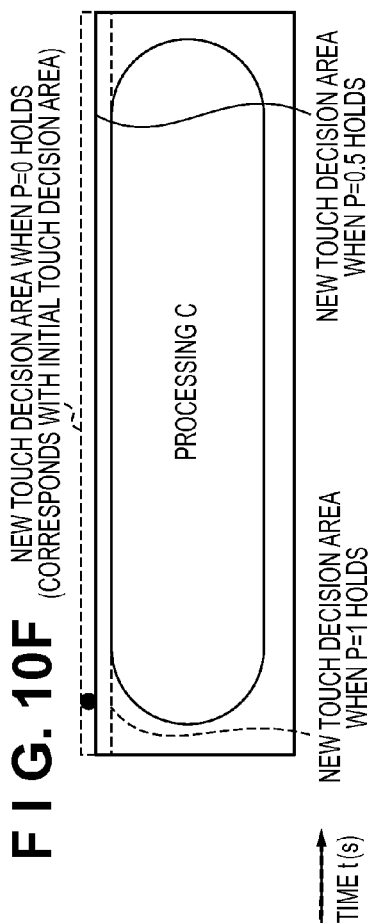

When it is determined that the probability of erroneous operation is high, as shown in FIG. 10C, the shape of the decision area is deformed such that the processing-C touch decision area regarding the erroneous operation does not include a circle having a radius r around the touch point Y. It is desirable that the radius r of the circle is determined depending on the accuracy and resolution of the touch panel. On the other hand, when it is determined that the probability of erroneous operation is intermediate, as shown in FIG. 10D, the shape of the decision area is deformed such that the touch point Y is positioned on the border of the processing-C touch decision area regarding the erroneous operation. When it is determined that the probability of erroneous operation is low, the decision area is not deformed.

Figure 10E:
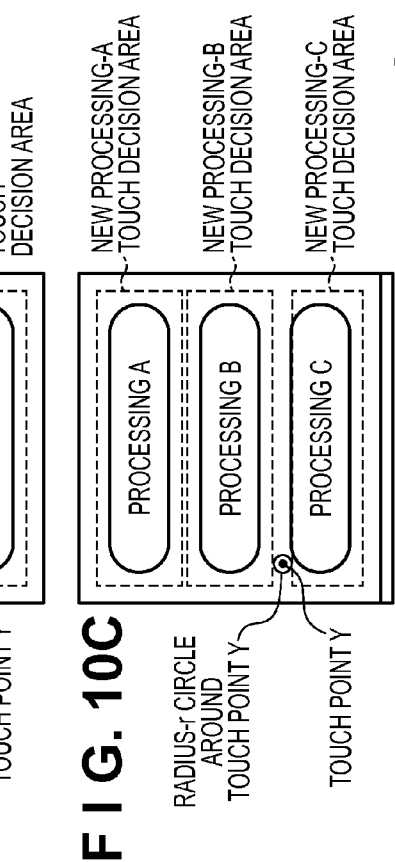
Figure 10F:
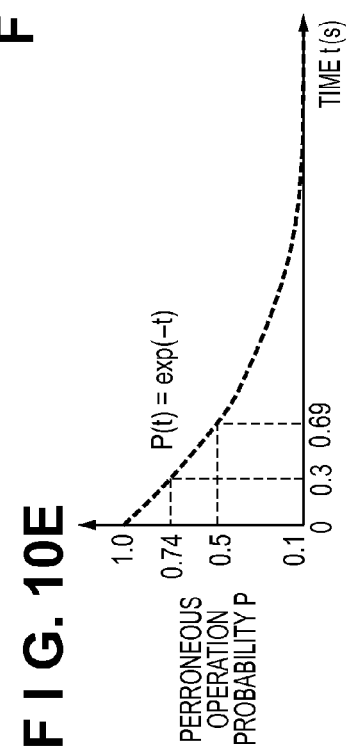

In this example, the probability of erroneous operation is classified in three stages, however, four-stage classification may be made. Further, it may be arranged such that a function P(t) to reduce erroneous operation probability P as time t is longer is defined, and the touch decision area is updated in accordance with the value of the function P(t). In FIG. 10E, the function P(t) is defined using an exponential function. According to FIG. 10E, the value of the erroneous operation probability P at the point of 0 second is 1, then the value of the erroneous operation probability P is 0.5 at the point of 0.69 seconds. The value of the erroneous operation probability P is lower than 0.05 at the point of 3 seconds and later, and it can be regarded that P=0 holds. FIG. 10F is an example where the touch decision area is updated when P=0.5 holds. The touch decision area when P=0 holds corresponds with the initial status. The touch decision area when P=0.5 holds is changed to have an intermediate shape between the touch decision area when P=0 holds and the touch decision area when P=1 holds.

When the user aborts the processing at once, as the time before the abortion is short, there is a high probability that the operation was not intended by the user. By the processing control as described above, in such case, when the same touch position or near position is touched, the processing C that does not match the user's intention is hardly executed. Further, it is possible to easily execute the processing intended by the user.

Fifth Embodiment

In the fourth embodiment, the method of calculating the probability that the selection was not intended by the user based on time from the start of processing to the abortion has been described. In this embodiment, the calculation of the probability by another method will be described.

Since the hardware configuration of the fifth embodiment is the same as that described in the first embodiment, the explanation thereof will be omitted.

Figure 12:
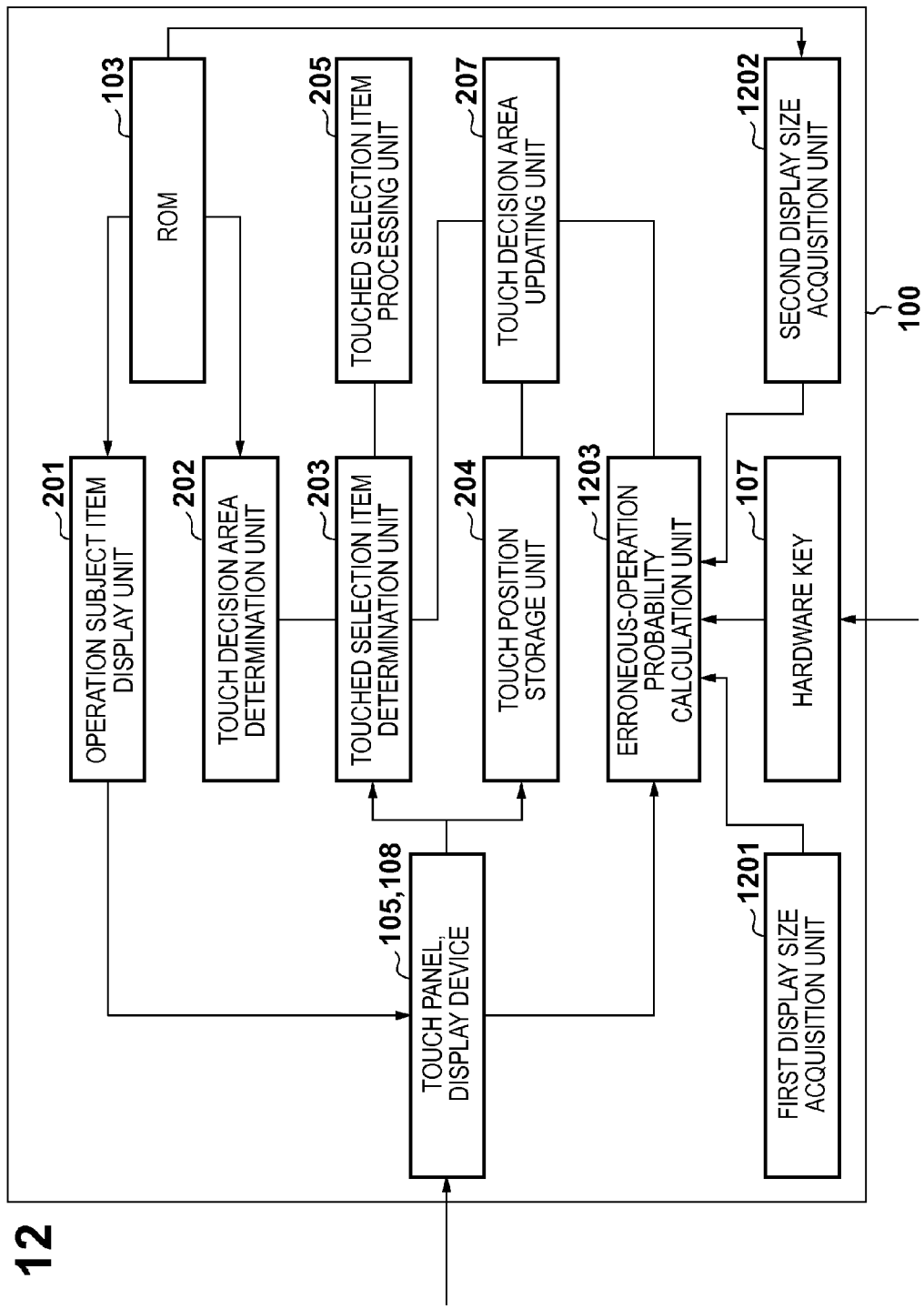
FIG. 12 is a block diagram showing the functional configuration of the electronic device according to a fifth embodiment.
Figure 13:
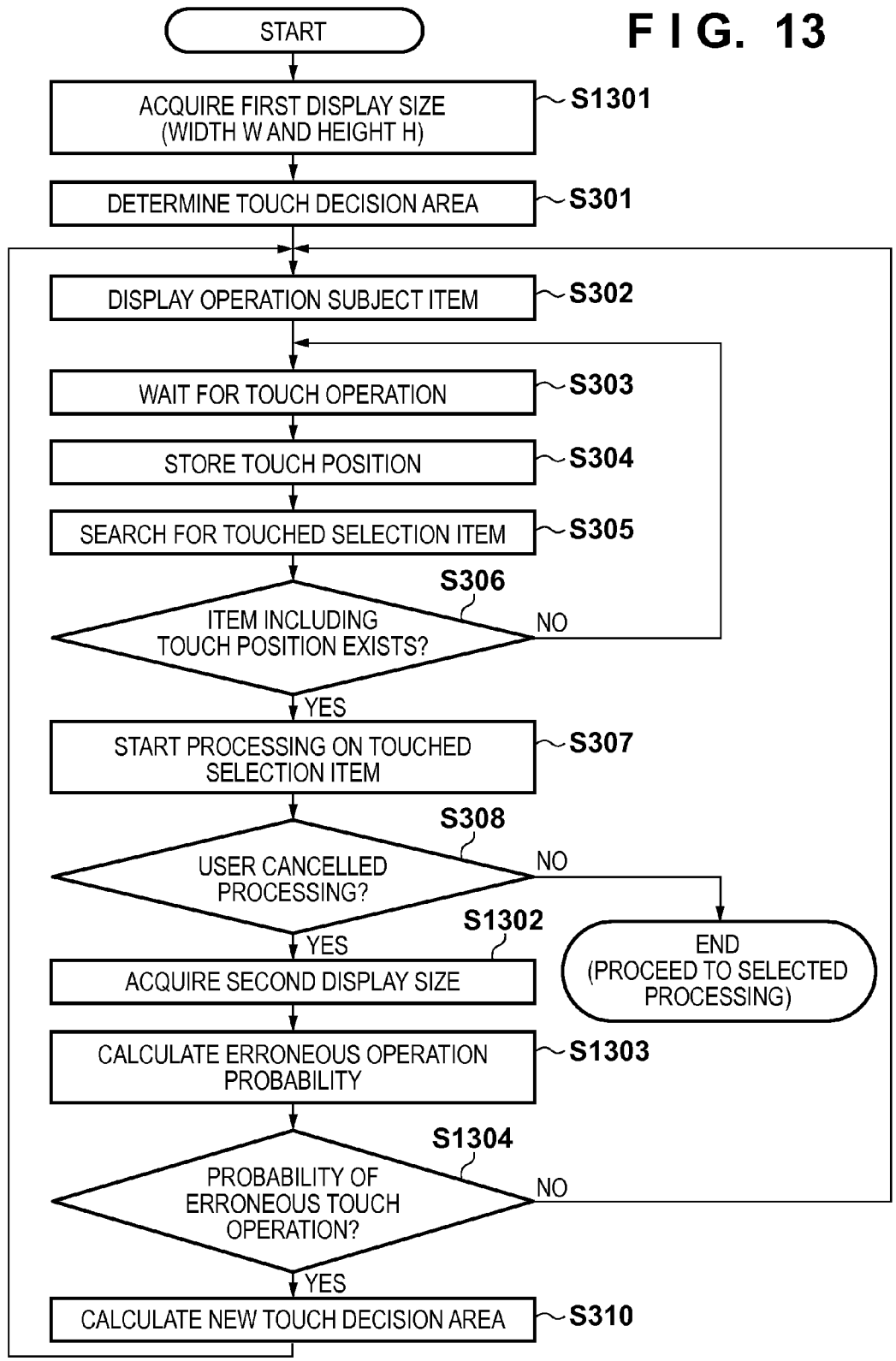
FIG. 13 is a flowchart showing the flow of the processing according to the fifth embodiment.

The flow of processing related to the touch panel operation in the electronic device to which the fifth embodiment is applied will be described using the block diagram of FIG. 12 showing the functional configuration and the flowchart of FIG. 13 according to the present embodiment.

FIG. 11C is an explanatory diagram of the screen transition according to the present embodiment. When the user selects the processing C in the processing selection screen 1109, the screen changes to a "processing C in execution" screen 1110, and the processing C is started. During the execution of the processing C, when a BACK key 1112 is depressed, the processing selection screen 1109 is restored. Further, when enlarged display is selected in the processing selection screen 1109, the screen changes to an enlarged processing selection screen 1111, and a part of display contents of the processing selection screen 1109 (enlarged display area 1113) is doubled in length and width. It may be arranged such that the enlarged display area is designated by quickly performing the tap operation of the touch panel at around the same point and the part around the tapped point is enlarged. Further, as long as it is possible to detect operations with two or more fingers, enlargement by pinch operation may be performed. Thus the enlargement method is not limited. When the processing C is selected in the enlarged processing selection screen 1111, the screen changes to the "processing C in execution" screen 1110. In the case where the screen has changed from the enlarged processing selection screen 1111, when the BACK key 1112 is depressed in the "processing C in execution" screen 1110, the enlarged processing selection screen 1111 is restored.

First, the flow of processing in the case of the transition from the processing selection screen 1109 to the "processing C in execution" screen 1110 will be described. A first display size acquisition unit 1201 acquires width and height by pixel as a first display size for determining whether or not the touch operation was erroneous (S1301). The first display size is previously determined based on the accuracy of the touch sensor of the touch panel and the resolution of the display device. In this example, the width is 40 pixels and the height is 60 pixels. As the following steps S301 to S306 are identical to those described in the first embodiment, the explanations thereof will be omitted. At step S306, touch panel operation processing device is in the status of the processing selection screen 1109. When it is determined at step S306 that the processing C has been selected, the processing C is started at step S307, and the screen changes to the "processing C in execution" screen 1110. At step S308, it is determined whether or not the user has depressed the BACK key 1112. When it is determined that the BACK key 1112 has not been depressed, the processing C is continued. When it is determined that the BACK key 1112 has been depressed, a second display size acquisition unit 1202 acquires the width and height of the selected item (S1302). As shown in FIG. 16A, information on the selection subject item keys is linked with a displayed screen ID and stored. In the processing selection screen 1109, the information is displayed not in enlarged status but in the initial status. FIG. 16B shows the sizes of the respective selection item keys in the processing selection screen 1109.

Next, an erroneous-operation probability calculation unit 1203 calculates the erroneous operation probability P (S1303). The method of erroneous operation probability calculation will be described in detail. FIG. 16D is a graph showing the width and height values of the second display size acquired at step S1302 and the erroneous operation probabilities of the respective values. A width erroneous operation probability Pw is linearly reduced from 1.0 to 0.0 when the display size changes from 0 pixel to 40 pixels, and the erroneous operation probability is 0 when the display size is 40 pixels or greater. A height erroneous operation probability Ph is linearly reduced from 1.0 to 0.0 when the display size changes from 0 pixel to 60 pixels, and the erroneous operation probability is 0 when the display size is 60 or greater. The erroneous operation probability P is a square root of the sum of the two squares of the width erroneous operation probability Pw and the height erroneous operation probability Ph.

$$P=(Pw^2+Ph^2)^{1/2} \qquad (1)$$

Note that when P exceeds 1, P is 1. Only when the width and the height acquired at step S1302 are greater than the width and height of the first display size acquired at step S1301, it is determined that the display size is sufficient and the erroneous operation probability is 0. In the processing selection screen 1109, as the width is 160 pixels and the height is 40 pixels, Pw=0.0 holds and Ph=0.67 holds. The erroneous operation probability P is 0.67.

Next, at step S1304, it is determined whether or not there is a probability that the touch operation was an erroneous operation. When P=0 holds as the erroneous operation probability P, it is determined that the touch operation was not erroneous, and the process returns to step S302. When P>0 holds, it is determined that there is a probability that the touch operation was an erroneous operation, and the process proceeds to step S310. At step S310, the touch decision area update unit 207 updates the touch decision area, and the process returns to step S302.

FIG. 16E shows an example of the method of updating the touch decision area. When P=0 holds, the touch decision area corresponds with the initial touch decision area (rectangle ABCD). When P=1 holds, the touch decision area corresponds with the display size and position indicated in FIG. 16A (rectangle A'B'C'D'). At this time, the center of the touch decision area when P=0 holds and the center of the touch decision area when P=1 holds are the same. The center of a touch decision area A"B"C"D" when P=x(0≤x≤1) holds corresponds with the center of a touch decision area when P=0 holds and P=1 holds. Further, the point A" exists on a line segment AA', and the length of the line segment AA" is x times of the length of the line segment AA'. When the value of P is 0.67, the decision area is the touch decision area A"B"C"D" indicated with a solid line in FIG. 16E.

Next, the transition from the enlarged processing selection screen 1111 to the "processing C in execution" screen 1110 will be described. As steps S1301 to S308 have been already described, the explanations thereof will be omitted. Next, processing at step S1302 will be described. In the enlarged processing selection screen 1111, a part of rectangular area displayed in the processing selection screen 1109 is doubled in length and width, and keys of the processing B and the processing C run over in the lateral direction. The second display size is the area of the key of the enlarge-displayed processing C. It is acquired as a rectangular area included in the display area of the screen. FIG. 16C shows the display sizes of the selection items in the enlarged processing selection screen. As the display size, the width is 200 pixels and the height is 80 pixels. At step S1303, when the erroneous operation probability P is calculated, from the graph shown in FIG. 16D and the above-described expression (1), the value of the erroneous operation probability P is determined as 0. Accordingly, at step S1304, it is determined that there is no probability that the touch operation was an erroneous operation, and the process returns to step S302.

When a key having a sufficiently large display size has been selected, at least at that time, there is a high probability that the operation is intended by the user. On the other hand, when a key having an insufficient display size has been selected, there is a high probability that a key which the user was to touch does not corresponds with the selected key. In such case, by performing the above-described processing control, when the same touch position or its near position is touched, the processing C that does not match the user's intention is hardly executed. Further, it is possible to easily select the processing intended by the user.

Sixth Embodiment

In the fourth embodiment, the method of calculating the erroneous operation probability that the selection did not match the user's intention based on the time from the start of the processing to the abortion has been described. In the fifth embodiment, the method of calculating the erroneous operation probability that the selection did not match the user's intention based on the display size has been described. In this embodiment, a method of calculating the probability that the selection did not match the user's intention based on the relation between a touched position and the shape of a touch decision area will be described.

Figure 20:
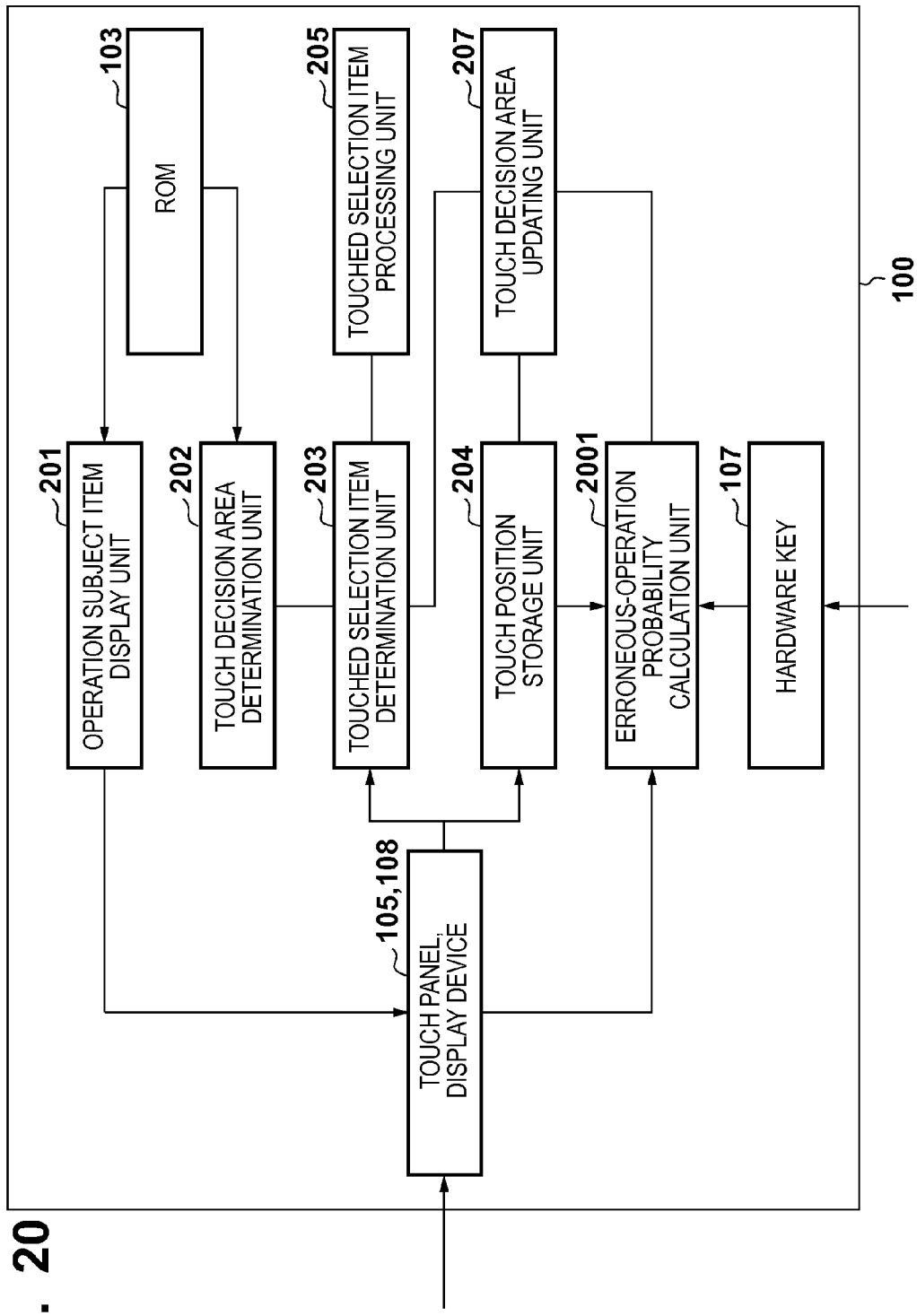
FIG. 20 is a block diagram showing the functional configuration of the electronic device according to a sixth embodiment.

As the hardware configuration of the sixth embodiment is the same as that described in the first embodiment, the explanation thereof will be omitted. The flow of the processing related to the touch panel operation in the electronic device to which the present embodiment is applied will be described with reference to the block diagram of FIG. 20 showing the functional configuration and the flowchart of FIG. 21. Further, the screen transition diagram shown in FIG. 11C will be used.

Figure 21:
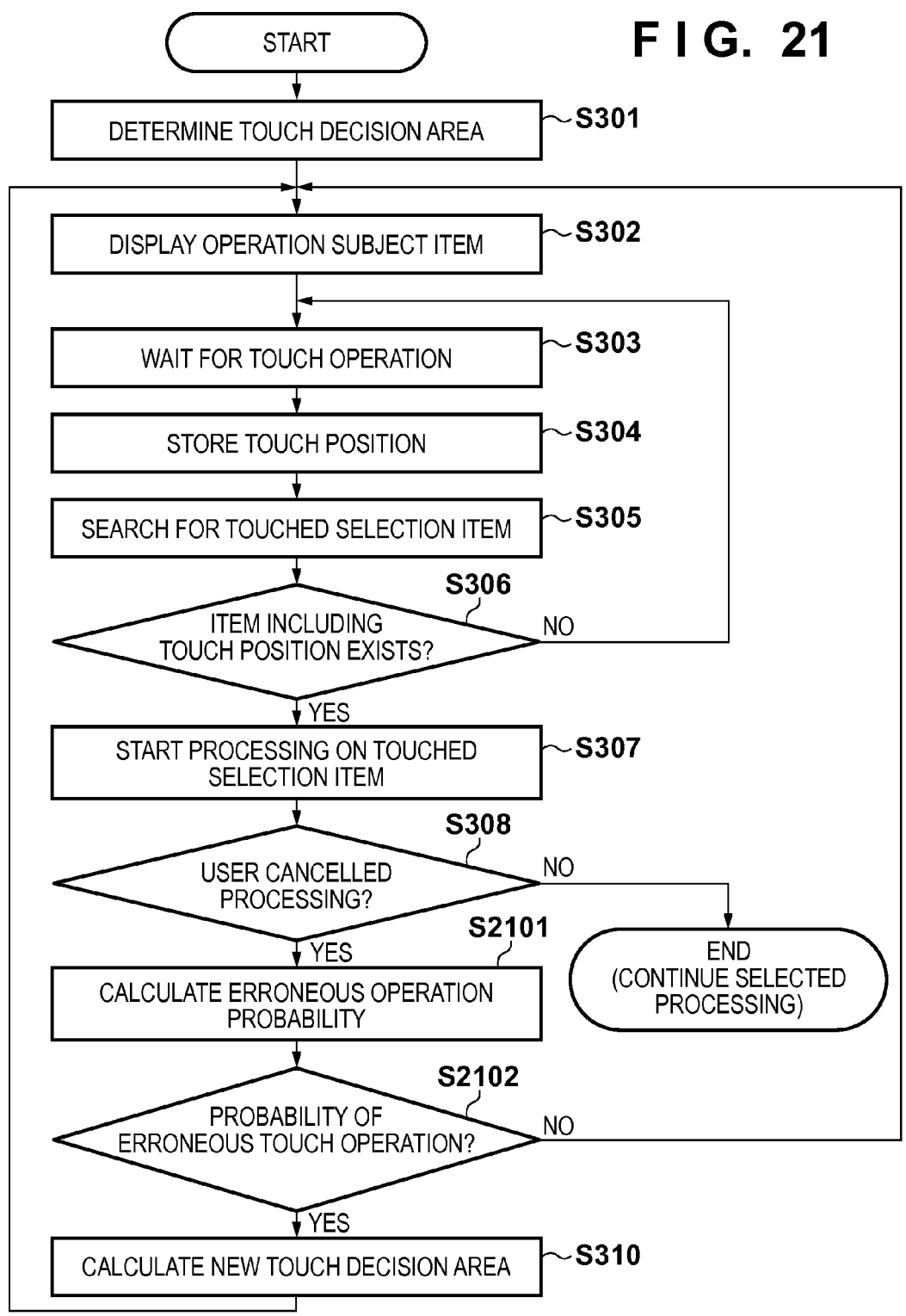
FIG. 21 is a flowchart showing the flow of the processing according to the sixth embodiment.

In FIG. 21, as steps S301 to S308 are identical to those described in the fifth embodiment, the explanations thereof will be omitted. An erroneous-operation probability calculation unit 2001 calculates the erroneous operation probability P based on the touch position stored at step S304 (S2101).

Figure 22B:
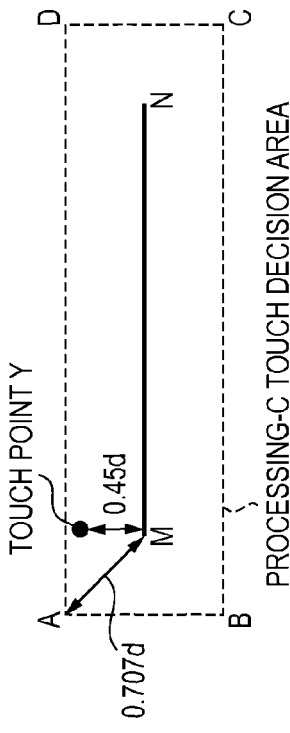
FIGS. 22A to 22D are schematic diagrams explaining the touch decision area update method according to the sixth and seventh embodiments.
Figure 22A:
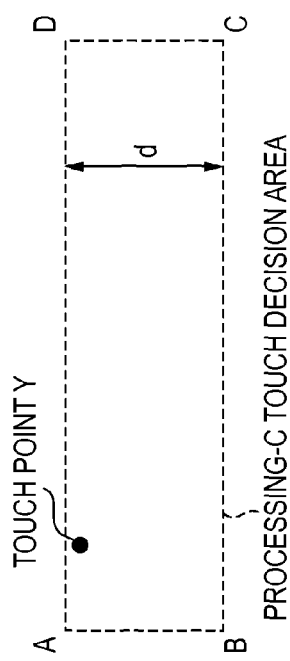

The processing at step S2101 will be described in detail using the drawings. FIG. 22A is a schematic diagram showing the relation between the processing-C touch decision area and the touch point Y. Note that the processing-C touch decision area is represented as a rectangle ABCD. In the rectangle ABCD, a shorter side has a length d. Next, a central line segment MN in the touch decision area is obtained as follows. On a mediator of a line segment AB, a point inside the rectangle, away from the line segment AB by d/2, is a point M. On a mediator of a line segment CD, a point inside the rectangle, away from the line segment CD by d/2, is a point N. The erroneous operation probability P is obtained by substituting a minimum distance s from the touch point to the line segment MN, into the expression shown in FIG. 22C. According to FIG. 22B, the minimum distance from the touch point Y to the line segment MN is 0.45 d. Accordingly, the erroneous operation probability P is about 0.41. Note that the minimum distance from the vertex A of the rectangle to the line segment MN corresponds to the length of the line segment AM (about 0.707 d). When the vertex A is the touch point, the erroneous operation probability P is 1. Further, when a point on the line segment MN is the touch point, the erroneous operation probability P is 0.

After the calculation of the erroneous operation probability P, it is determined whether or not the erroneous operation probability P is 0 (S2102). When it is determined that the P is not 0, the touch decision area is updated based on the erroneous operation probability P at step S310. The touch decision area is updated by the method described in the fifth embodiment.

In a case where the touch position is away from the center of a selected item, by the processing control as described above, when the same touch position or near position is touched, the processing C that does not match the user's intention is hardly executed. Further, it is possible to easily select the processing intended by the user.

Seventh Embodiment

In the fourth embodiment, the method of calculating the erroneous operation probability that the selection did not match the user's intention based on the time from the start of the processing to the abortion has been described. In the fifth embodiment, the method of calculating the erroneous operation probability that the selection did not match the user's intention based on the display size has been described. In the sixth embodiment, the method of calculating the erroneous operation probability that the selection did not match the user's intention based on the relation between the touched position and the shape of the touch decision area has been described. In this embodiment, a method of calculating the probability using the above three methods will be described.

As the hardware configuration of the seventh embodiment is the same as that described in the first embodiment, the explanation thereof will be omitted.

Figure 17:
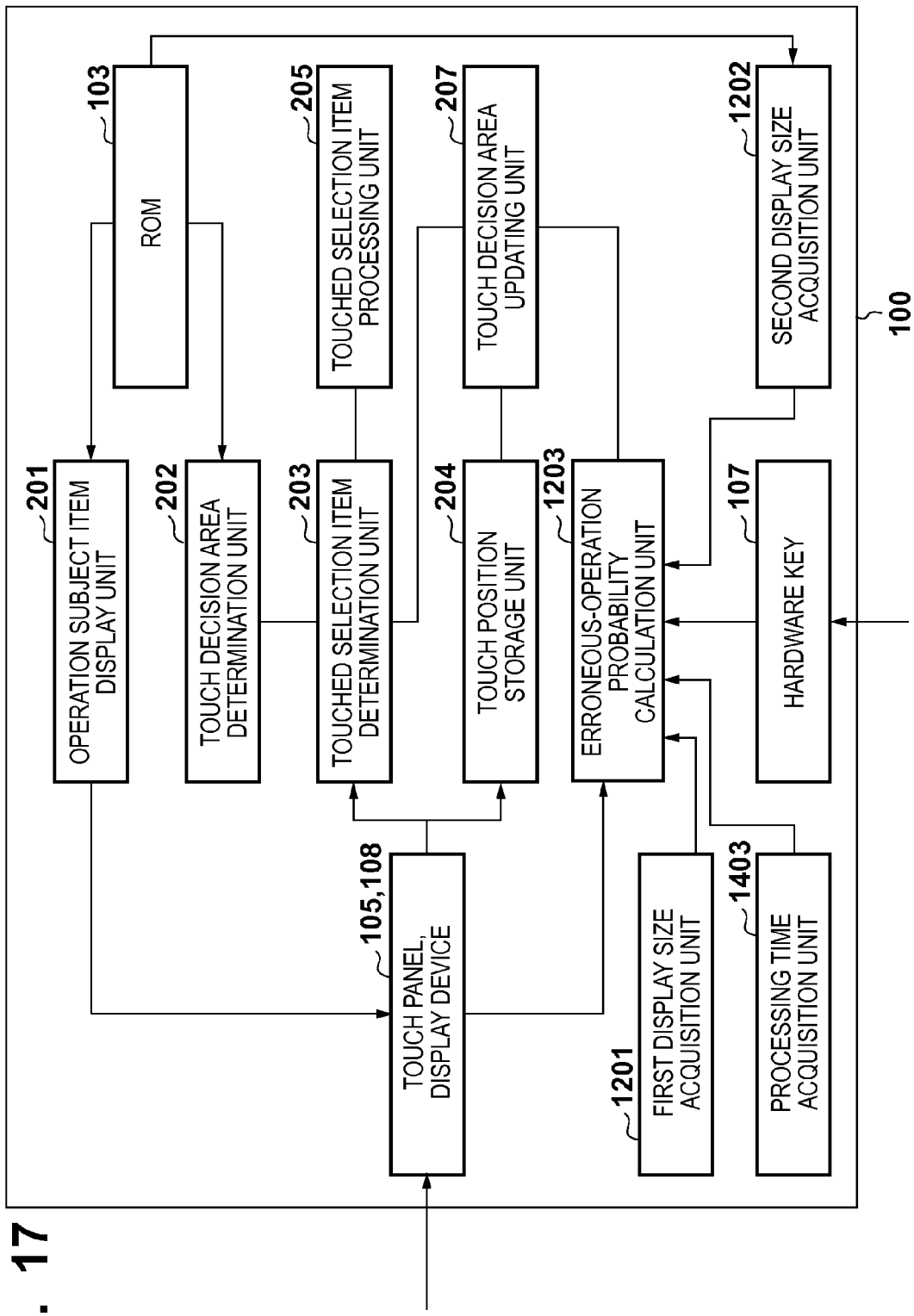
FIG. 17 is a block diagram showing the functional configuration of the electronic device according to a seventh embodiment.
Figure 18:
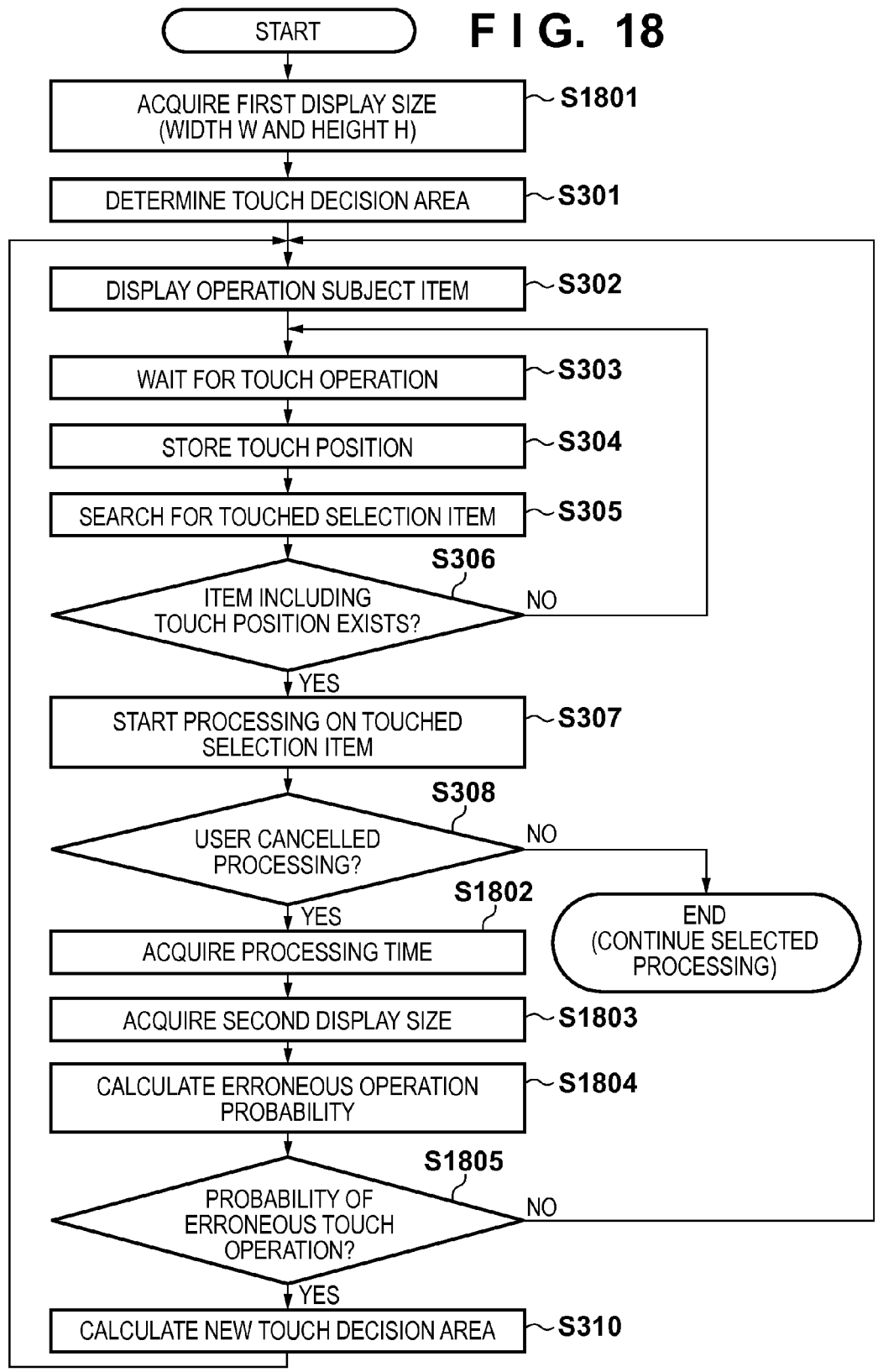
FIG. 18 is a flowchart showing the flow of the processing according to the seventh embodiment.

The flow of the processing related to the touch panel operation in the electronic device to which the seventh embodiment is applied will be described with reference to the block diagram of FIG. 17 showing the functional configuration and the flowchart of FIG. 18 according to the present embodiment. Further, the screen transition diagram shown in FIG. 11C is used.

First, the first display size acquisition unit 1201 acquires a width and a height by pixel as the first display size for determination as to whether or not the touch operation was an erroneous operation (S1801). As in the case of the fifth embodiment, the size is 40 pixels in length and 60 pixels in height. As steps S301 to S308 are identical to those described in the fifth embodiment, the explanations thereof will be omitted. Note that by step S306, the processing selection screen 1109 is displayed, and after the determination at step S307 that the processing C has been selected, the screen changes to the "processing C in execution" screen 1110. When it is determined at step S308 that the BACK key 1112 has been depressed, the processing selection screen 1109 is restored.

Next, the processing time acquisition unit 1403 acquires the time from the start of the processing C to the depression of the BACK key 1112 (S1802). In this embodiment, the obtained value is 0.3 seconds. Nex, the second display size acquisition unit 1202 acquires the width and height of the selected item (S1803). As in the case of the fifth embodiment, the acquired numerical values are 160 pixels width and 40 pixels height.

Next, the erroneous operation probability P is calculated. First, from the processing time acquired at step S1802, the erroneous operation probability Pt of the processing time is calculated using the graph and the expression shown in FIG. 10E. When the acquired time is 0.3 seconds, the Pt value is about 0.74. Next, based on the display size, the erroneous operation probability Pw of the width and the erroneous operation probability Ph of the height are obtained. By calculation based on the graph shown in FIG. 16D, as the erroneous operation probability Pw of the width and the erroneous operation probability Ph of the height, Pw=0 holds and Ph=0.67 holds. Next, a touch-position erroneous operation probability Pp is obtained based on the touch position stored at step S304. As shown in FIG. 22B, when the touch position is the touch point Y, the erroneous operation probability Pp is obtained in accordance with the expression in FIG. 22C, and Pp=0.41 holds. The erroneous operation probability P is obtained by calculating the square root of the sum of the squares of Pt, Pw, Ph and Pp. When Pt=0.74 holds, Pw=0 holds, Ph=0.67 holds and Pp=0.41, P≅1.08 holds.

Figure 22D:
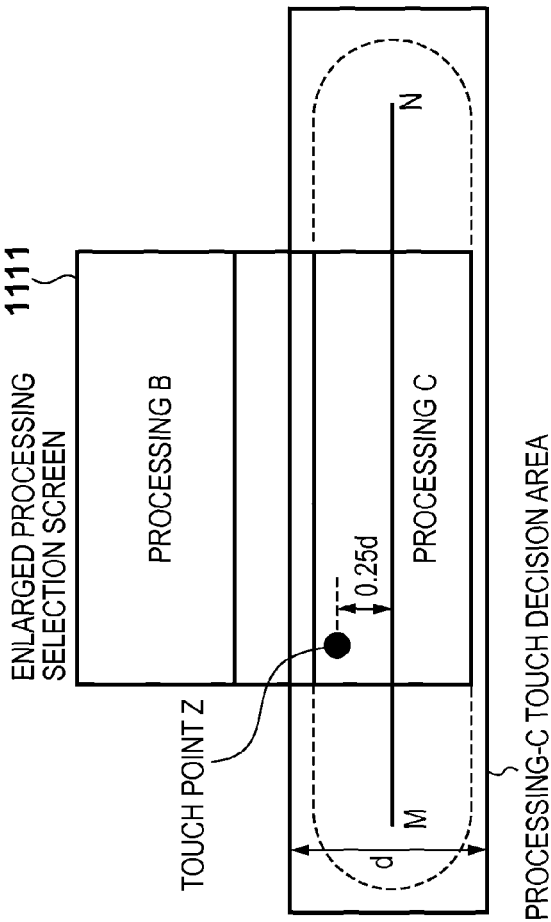
Figure 22C:
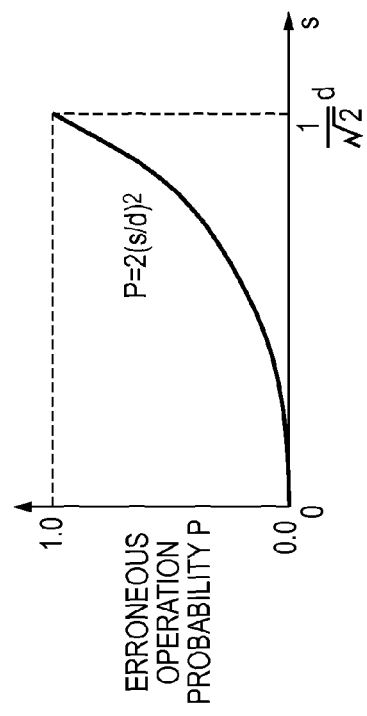

Next, a case where the enlarged processing selection screen 1111 changes to the "processing C in execution" screen 1110 then the BACK key 1112 is depressed 0.3 seconds later will be described. Assuming that the touched position in the enlarged processing selection screen 1111 is a touch point Z, the relation between the point and the touch decision area is as shown in FIG. 22D. As the erroneous operation probability Pt does not depend on display size, Pt=0.74 holds. As the erroneous operation probability Pw of the width and the erroneous operation probability Ph of the height, Pw=0 holds and Ph=0 holds from the expression in FIG. 16D. As the erroneous operation probability Pp, as the distance from the central line segment MN of the touch decision area is 0.25 d as shown in FIG. 22D, Pp=0.125 holds from the expression in FIG. 22C. Accordingly, the erroneous operation probability P is about 0.75.

Next, it is determined at step S1805 whether or not the erroneous operation probability P is 0. When it is determined that the erroneous operation probability P is 0, the process returns to step S302. When the erroneous operation probability P is not 0, a new touch decision area is calculated at step S310, and the process returns to step S302. Note that at step S310, when the erroneous operation probability P exceeds 1, the calculation is made as P=1 holds.

Note that the method for calculating the erroneous operation probability P is merely an example, but other methods may be used. Further, upon calculation of combined plural erroneous operation probabilities, weighting may be performed. For example, when operation is performed using a large display, as the ratio of contribution of the erroneous operation probability regarding display size to the entire erroneous operation probability may be low. In such case, the weighting of the erroneous operation probability regarding the display size is reduced, so as to calculate the erroneous operation probability with higher accuracy.

By the above-described processing control, it is possible to increase the accuracy of calculation of the probability that the selection did not match the user's intention by combining the touch position, time from the start of the processing to the return, and the display size of the selected item. Accordingly, when the same touch position or its near position is touched, the processing C that does not match the user's intention is hardly executed. Further, it is possible to easily select the processing intended by the user.

Eighth Embodiment

In the fourth to seventh embodiments, the method for calculating the probability that the selection did not match the user's intention, and the method of reducing the touch decision area of a selected item with a probability of erroneous operation in accordance with the level of the probability have been described. In this embodiment, a method of updating touch decision areas of adjacent selection items to the selected item with a probability of erroneous operation will be described.

As the hardware configuration of the eighth embodiment is the same as that described in the first embodiment, the explanation thereof will be omitted. In this embodiment, description will be made with reference to the functional configuration (FIG. 17) and the flowchart (FIG. 18) of the seventh embodiment.

Figure 19A:
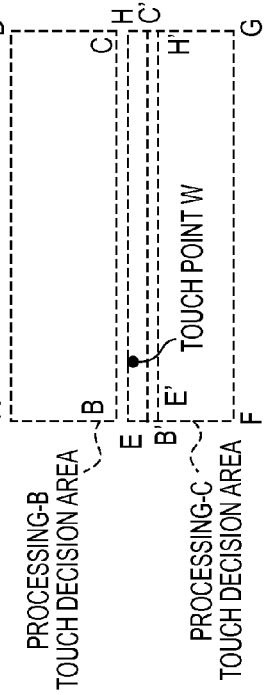
FIGS. 19A to 19F are schematic diagrams explaining the touch decision area update method according to an eighth embodiment.
Figure 19C:
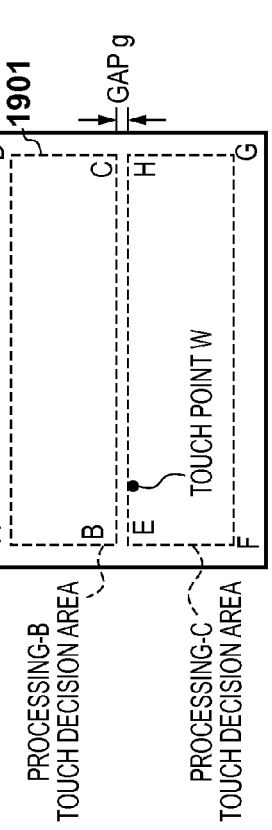
Figure 19B:
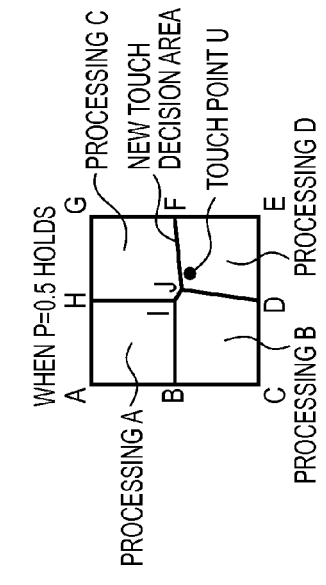

As steps S1801 to S1805 are identical to those described in the seventh embodiment, the explanations thereof will be omitted. The processing at step S310 that the touch decision area update unit 207 changes the touch decision area using the erroneous operation probability P obtained at step S1804 will be described. Note that at step S310, the erroneous operation probability P is rounded within 0≤P≤1. FIG. 19A shows initial touch decision areas of the processing B and the processing C in a processing selection screen 1901. Next, processing when a touch point W is touched in the processing section screen 1901, then the processing C is started, and the processing selection screen 1901 is restored will be described. The processing-B touch decision area is represented with a rectangle ABCE, and the processing-C touch decision area is represented with a rectangle EFGH. The rectangles ABCD and EFGH are arrayed with a gap g between a side BC and a side EH. Among the four sides of the rectangle EFGH, the side EH is the closest to the touch point W. The processing-C touch decision area is reduced by parallel-translating the side EH. Using the erroneous operation probability P, a point E' when EE'=P·EF holds is placed on a line segment EF, and a point H' when HH'=P·HG holds is placed on a line segment HG. Further, a point C' and a point H' when vector BE=vector B'E' holds and vector CH=vector C'H' are obtained. Next, a rectangle AB'C'D is set as a new processing-B touch decision area and a rectangle E'FGH' is set as a new processing-C touch decision area, then the processing at step S310 ends.

By the processing control as described above, in a caser where the selection did not match the user's intention, when the same screen is operated, the processing C that does not match the user's intention is hardly executed. Further, it is possible to easily select the processing B intended by the user.

Note that in the above-described embodiment, the method of updating the touch decision areas of two selection items has been described. Further, it may be arranged such that three or more touch decision areas are updated.

Figure 19D:
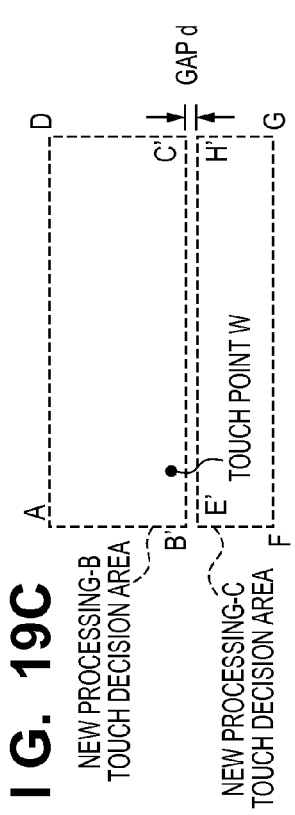
Figure 19E:
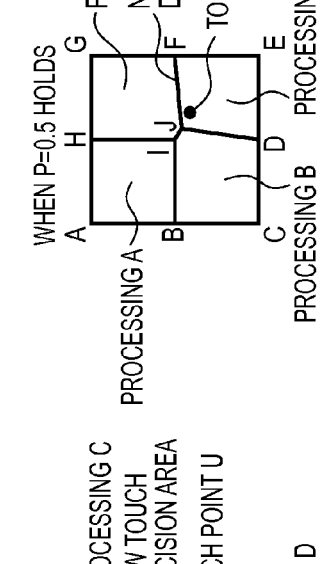
Figure 19F:
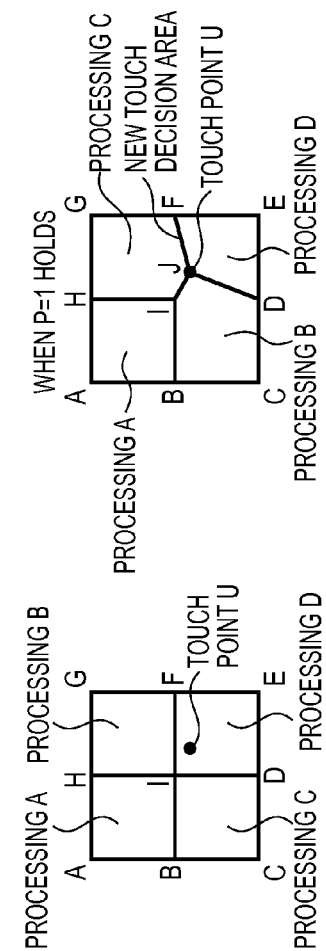

FIG. 19D shows initial touch decision areas of the processing A to processing D arrayed in a grid pattern. Next, the processing when the touch position is a touch point U will be described. As the closest grid point to the touch point U is a point I, the processing-D touch decision area is reduced by moving the point I. When the erroneous operation probability P obtained at step S1804 is 1, the touch point U is used as a point J, and the processing-D touch decision area is represented as a rectangle DEFJ. Further, the processing-B touch decision area is deformed to a polygon BCDJI, and the processing-C touch decision area is deformed to a polygon FGHIJ. FIG. 19E shows these touch decision areas. Further, when the value of the erroneous operation probability P is equal to or greater than 0 and less than 1, a point J when the length of a line segment IJ is P times of a line segment IU is calculated on a line segment JU, to update the respective touch decision areas. FIG. 19F shows the touch decision area update when P=0.5 holds. With the above-described processing, the processing at step S310 ends.

By the above-described processing control, in a case where the selection did not match the user's intention, when the same screen is operated, the processing D that does not match the user's intention is hardly executed. Further, it is possible to easily select the processing B or the processing C intended by the user.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

In the above-described embodiments, when the processing corresponding to a selected item is started, it is determined whether or not a designation input indicating that the processing-started item was not selected intentionally by the user has been made. Further, it may be arranged such that after the selection of a selection item by touch operation, it is determined whether or not a designation input indicating that the selection of the item is not intended by the operator has been made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-125150, filed May 31, 2012, and No. 2013-078984, filed Apr. 4, 2013, which are hereby incorporated by reference herein in their entirety.

What is claimed is:

1. An information processing apparatus having a display unit and a touch panel on a screen of the display unit, the apparatus comprising:
a processor implementing functions of:
a display control unit which controls the display unit to display an image;
a specifying unit which recognizes a first touch operation by a user to a first image displayed by said display unit and specifies a selected item among a plurality of items included in the first image, wherein said specifying unit specifies, as the selected item, an item corresponding to a touch decision area encompassing a touch position of the first touch operation, among a plurality of touch decision areas corresponding to the plurality of items;
an execution unit which executes processing corresponding to the item specified by said specifying unit;
a first determination unit which, after the display unit displays a second image following the first image due to the execution by the execution unit, determines whether or not the user has made a second touch operation for canceling the first touch operation;
a second determination unit which, when said first determination unit determines that the second touch operation has been made, determines a level indicating probability of erroneous operation of the first touch operation, and
an update unit, which updates a size of the touch decision area corresponding to the selected item so that the higher the level determined by said second determination unit, the larger the change in the size of the touch decision area corresponding to the selected item is, and, when the level determined by said second determination unit is a lowest level, does not change the size of the touch decision area corresponding to the selected item,
wherein said display control unit causes the display unit to re-display the first image in response to inputting of the second touch operation and said specifying unit specifies, when a new touch is detected, a newly selected item among the plurality of items included in the re-displayed first image, referring to the updated touch decision area, and
wherein said update unit updates the size of the touch decision area corresponding to the selected item without changing a size of the selected item so that each size of the plurality of items included in the re-displayed first image is the same as each size of the plurality of items included in the first image displayed during the first touch operation.

2. The information processing apparatus according to claim 1, wherein said update unit updates the size of the touch decision area corresponding to the selected item so that the higher the level determined by said second determination unit, the narrower the shape of the touch decision area corresponding to the selected item becomes.

3. The information processing apparatus according to claim 1, wherein, when the level determined by said second determination unit is a highest level, said update unit updates the touch decision area corresponding to the selected item so that the updated touch decision area does not include the touch position of the first touch operation.

4. The information processing apparatus according to claim 1, wherein said update unit updates the size of the touch decision area so as to reduce the size of the touch decision area when the probability of the erroneous operation is high to be narrower than the touch decision area when the probability of the erroneous operation is low.

5. The information processing apparatus according to claim 1, wherein said second determination unit further refers to the size of the selected item and a relationship between the touch position of the first touch operation and the shape of the touch decision area corresponding to the selected item to determine the level indicating probability of erroneous operation of the first touch operation,
wherein said second determination unit determines, in a case where the touch position is away from the center of the selected item, that the first touch operation was an erroneous operation.

6. The apparatus according to claim 1, wherein said second determination unit determines
that the level indicating probability of erroneous operation of the first touch operation is a highest level, if a period between times of the first touch operation and the second touch operation is less than a first threshold, and
that the level indicating probability of erroneous operation of the first touch operation is a lowest level, if the period between times of the first touch operation and the second touch operation is more than a second threshold larger than the first threshold.

7. The apparatus according to claim 1, wherein said second determination unit determines the level indicating probability of erroneous operation of the first touch operation, based on the size of the selected item when the first touch operation has been made.

8. The apparatus according to claim 1, wherein said second determination unit determines the level indicating probability of erroneous operation of the first touch operation, based on a relationship between the touch position of the first touch operation and the shape of the touch decision area corresponding to the selected item.

9. The apparatus according to claim 8, wherein said second determination unit determines that, the longer the distance from the center position of the selected item to the touch position of the first touch operation, the higher the level indicating probability of erroneous operation of the first touch operation is.

10. The apparatus according to claim 8, wherein said update unit updates the size of the touch decision area so as to reduce the size of the touch decision area when the probability of the erroneous operation is high to be narrower than the touch decision area when the probability of the erroneous operation is low.

11. A control method of an information processing apparatus, the method comprising:
controlling a display unit to display an image;
recognizing a first touch operation by a user to a first image displayed by the display unit;
specifying a selected item among a plurality of items included in the first image,
wherein, in said specifying step, an item corresponding to a touch decision area encompassing a touch position of the first touch operation is specified as the selected item, among a plurality of touch decision areas corresponding to the plurality of items;
executing processing corresponding to the item specified in said specifying step;
determining whether or not the user has made a second touch operation for canceling the first touch operation after the display unit displays a second image following the first image due to the execution in the executing step;
determining a level indicating probability of erroneous operation of the first touch operation when it is determined that the second touch operation has been made;
updating a size of the touch decision area corresponding to the selected item so that the higher the determined level, the larger the change in the size of the touch decision area corresponding to the selected item is, and not changing the size of the touch decision area corresponding to the selected item when the determined level is a lowest level;
causing the display unit to re-display the first image in response to inputting of the second touch operation; and
specifying, when a new touch is detected, a newly selected item among the plurality of items included in the re-displayed first image, referring to the updated touch decision area,
wherein, in said updating step, the size of the touch decision area corresponding to the selected item is updated without changing a size of the selected item so that each size of the plurality of items included in the re-displayed first image is the same as each size of the plurality of items included in the first image displayed during the first touch operation.

12. An information processing apparatus having a display unit and a touch panel on a screen of the display unit, the apparatus comprising:
a processor implementing functions of:
a display control unit, which controls the display unit to display an image in which a plurality items are included, wherein each item is associated with a touch decision area which is used for determining that a corresponding item is selected by a user if a touch position by the user is within the touch decision area;
a specifying unit, which recognizes a first touch operation by the user and specifies a selected item among the plurality of items included in the first image, by determining which touch decision area the first touch operation is positioned within;
an execution unit, which executes processing corresponding to the item specified by said specifying unit;
a first determination unit, which, after the display unit displays a second image following the first image due to the execution by the execution unit, determines whether or not the user has made a second touch operation for canceling the first touch operation;
a second determination unit, which, when said first determination unit determines that the second touch operation has been made, determines a level indicating probability of erroneous operation of the first touch operation; and
an update unit, which updates a size of the touch decision area corresponding to the selected item by changing, in accordance with the level determined by said second determination unit, a boundary of the touch decision area corresponding to the selected item,
wherein said display control unit causes the display unit to re-display the first image in response to inputting of the second touch operation and said specifying unit specifies, when a new touch is detected, a newly selected item among the plurality of items included in the re-displayed first image, referring to the updated touch decision area, and
wherein said update unit changes the boundary of the touch decision area corresponding to the selected item without changing a size of the selected item so that each size of the plurality of items included in the re-displayed first image is the same as each size of the plurality of items included in the first image displayed during the first touch operation.

13. The apparatus according to claim 12, wherein the level indicating probability of erroneous operation of the first touch operation corresponds to a period between times of the first touch operation and the second touch operation.

14. The apparatus according to claim 12, wherein the level indicating probability of erroneous operation of the first touch operation corresponds to the size of the selected item when the first touch operation has been made.

15. The apparatus according to claim 12, wherein the level indicating probability of erroneous operation of the first touch operation corresponds to a relationship between the touch position of the first touch operation and the shape of the touch decision area corresponding to the selected item.

16. A non-transitory computer-readable storage medium storing a program that when executed causes a computer to perform control method of an information processing apparatus, the method comprising:

controlling a display unit to display an image;

recognizing a first touch operation by a user to a first image displayed by the display unit;

specifying a selected item among a plurality of items included in the first image, wherein, in said specifying step, an item corresponding to a touch decision area encompassing a touch position of the first touch operation is specified as the selected item, among a plurality of touch decision areas corresponding to the plurality of items;

executing processing corresponding to the item specified in said specifying step;

determining whether or not the user has made a second touch operation for canceling the first touch operation after the display unit displays a second image following the first image due to the execution in the executing step;

determining a level indicating probability of erroneous operation of the first touch operation when it is determined that the second touch operation has been made;

updating a size of the touch decision area corresponding to the selected item so that the higher the determined level, the larger the change in the size of the touch decision area corresponding to the selected item is, and not changing the size of the touch decision area corresponding to the selected item when the determined level is a lowest level;

causing the display unit to re-display the first image in response to inputting of the second touch operation; and specifying, when a new touch is detected, a newly selected item among the plurality of items included in the re-displayed first image, referring to the updated touch decision area, wherein, in said updating step, the size of the touch decision area corresponding to the selected item is updated without changing a size of the selected item so that each size of the plurality of items included in the re-displayed first image is the same as each size of the plurality of items included in the first image displayed during the first touch operation.

17. A control method of an information processing apparatus, the method comprising:

controlling a display unit to display an image in which a plurality items are included, wherein each item is associated with a touch decision area which is used for determining that a corresponding item is selected by a user if a touch position by the user is within the touch decision area;

recognizing a first touch operation by the user;

specifying a selected item among the plurality of items included in the first image, by determining which touch decision area the first touch operation is positioned within;

executing processing corresponding to the item specified in said specifying step;

determining whether or not the user has made a second touch operation for canceling the first touch operation after the display unit displays a second image following the first image due to the execution in the executing step;

determining a level indicating probability of erroneous operation of the first touch operation when it is determined that the second touch operation has been made;

updating a size of the touch decision area corresponding to the selected item by changing, in accordance with the determined level, a boundary of the touch decision area corresponding to the selected item;

causing the display unit to re-display the first image in response to inputting of the second touch operation; and specifying, when a new touch is detected, a newly selected item among the plurality of items included in the re-displayed first image, referring to the updated touch decision area, wherein, in said updating step, the boundary of the touch decision area corresponding to the selected item is updated without changing a size of the selected item so that each size of the plurality of items included in the re-displayed first image is the same as each size of the plurality of items included in the first image displayed during the first touch operation.

18. A non-transitory computer-readable storage medium storing a program that when executed causes a computer to perform control method of an information processing apparatus, the method comprising:

controlling a display unit to display an image in which a plurality items are included, wherein each item is associated with a touch decision area which is used for determining that a corresponding item is selected by a user if a touch position by the user is within the touch decision area;

recognizing a first touch operation by the user;

specifying a selected item among the plurality of items included in the first image, by determining which touch decision area the first touch operation is positioned within;

executing processing corresponding to the item specified in said specifying step;

determining whether or not the user has made a second touch operation for canceling the first touch operation after the display unit displays a second image following the first image due to the execution in the executing step;

determining a level indicating probability of erroneous operation of the first touch operation when it is determined that the second touch operation has been made;

updating a size of the touch decision area corresponding to the selected item by changing, in accordance with the determined level, a boundary of the touch decision area corresponding to the selected item;

causing the display unit to re-display the first image in response to inputting of the second touch operation; and specifying, when a new touch is detected, a newly selected item among the plurality of items included in the re-displayed first image, referring to the updated touch decision area, wherein, in said updating step, the boundary of the touch decision area corresponding to the selected item is updated without changing a size of the selected item so that each size of the plurality of items included in the re-displayed first image is the same as each size of the plurality of items included in the first image displayed during the first touch operation.

* * * * *